US011681927B2

(12) United States Patent
Beller et al.

(10) Patent No.: US 11,681,927 B2
(45) Date of Patent: Jun. 20, 2023

(54) ANALYZING GEOTEMPORAL PROXIMITY OF ENTITIES THROUGH A KNOWLEDGE GRAPH

(71) Applicant: INTERNATIONAL BUSINESS MACHINES CORPORATION, Armonk, NY (US)

(72) Inventors: Charles E. Beller, Baltimore, MD (US); Edward G. Katz, Washington, DC (US); Michael Purdy, Aldie, VA (US); Richard Behrens, Jr., Alpine, UT (US)

(73) Assignee: International Business Machines Corporation, Armonk, NY (US)

( * ) Notice: Subject to any disclaimer, the term of this patent is extended or adjusted under 35 U.S.C. 154(b) by 304 days.

(21) Appl. No.: 16/837,999

(22) Filed: Apr. 1, 2020

(65) Prior Publication Data

US 2020/0311565 A1 Oct. 1, 2020

Related U.S. Application Data

(63) Continuation of application No. 16/370,968, filed on Mar. 30, 2019, now Pat. No. 11,526,769.

(51) Int. Cl.
*G06N 5/02* (2023.01)
*G06F 16/93* (2019.01)
(Continued)

(52) U.S. Cl.
CPC ............ *G06N 5/02* (2013.01); *G06F 16/387* (2019.01); *G06F 16/909* (2019.01); *G06F 16/9024* (2019.01); *G06F 16/93* (2019.01)

(58) Field of Classification Search
CPC .......... G06N 5/02; G06N 5/022; G06N 5/048; G06N 7/02; G06F 16/387; G06F 16/9024;
(Continued)

(56) References Cited

U.S. PATENT DOCUMENTS

| 2017/0277717 | A1* | 9/2017 | Asaad ...................... G06F 16/29 |
| 2017/0359236 | A1* | 12/2017 | Circlaeys .............. G06F 16/487 |
| 2020/0311563 | A1 | 10/2020 | Beller et al. |

FOREIGN PATENT DOCUMENTS

| CN | 103699663 | 4/2014 |
| CN | 111767407 A | 10/2020 |

OTHER PUBLICATIONS

Eccles et al., "Stories in GeoTime," IEEE Symposium on Visual Analytics Science and Technology, IEEE, 2007, pp. 19-26, 8 pages.
(Continued)

*Primary Examiner* — Sanchita Roy
(74) *Attorney, Agent, or Firm* — Kristofer Haggerty

(57) ABSTRACT

A controller generating a knowledge graph of entries, each entry comprising a separate entity identifier and a separate entity mention identifier within a separate document of a corpus of documents with a located relationship and one or more computed prefix-based geotemporal values determined from geotemporal information associated with the separate entity mention identifier within the separate document. The controller, in response to receiving an input comprising a particular entity and a threshold value, mapping the threshold value to a geospatial hash prefix type and a temporal hash prefix type. The controller applying geospatial hash prefix type and the temporal hash prefix type to the entries in the knowledge graph to determine a response to the input indicating one or more geotemporal proximate entities identified within a degree of geotemporal proximity to the particular entity set by the threshold value.

20 Claims, 14 Drawing Sheets

(51) Int. Cl.
*G06F 16/901* (2019.01)
*G06F 16/909* (2019.01)
*G06F 16/387* (2019.01)

(58) Field of Classification Search
CPC ........ G06F 16/909; G06F 16/93; G06F 16/29; G06F 16/487; G06F 16/489; G06F 16/9537; G06F 16/447; G06F 16/2477
See application file for complete search history.

(56) References Cited

OTHER PUBLICATIONS

Le-Phuoc, Danh, et al., "The Graph of Things: A Step Towards the Live Knowledge Graph of Connected Things," Web Semantics: Science, Services and Agents on the World Wide Web, 37 (2016): pp. 25-35, 10 pages.
Rospocher, Marco, et al., "Building Event-Centric Knowledge Graphs from News." Web Semantics: Science, Services and Agents on the World Wide Web, 37 (2016): pp. 132-151, 23 pages.
Mayr et al., "Once upon a Spacetime: Visual Storytelling in Cognitive and Geotemporal Information Spaces," MDPI, ISPRS International Journal of Geo-Information, 2018, 7, 96, 18 pages.
Neumaier et al., "Enabling Spatio-Temporal Search in Open Data," Working Papers on Information Systems, Information Business and Operations, Jan. 2018 (2018), 22 pages.
Gottschalk et al., "EventKG: A Multilingual Event-Centric Temporal Knowledge Graph," arXiv.org, arXiv:1804.04526v1, Apr. 12, 2018, 15 pages.
Wikipedia, "Geohash", accessed online from <https://en.wikipedia.org/wiki/Geohash> as of Sep. 23, 2018, 6 pages.
U.S. Appl. No. 16/370,968, filed Mar. 30, 2019, in re Beller.
"List of IBM Patents or Patent Applications Treated as Related", dated Apr. 2, 2020, 2 pages.
"List of IBM Patents or Patent Applications Treated as Related", dated Nov. 5, 2020, 2 pages.

* cited by examiner

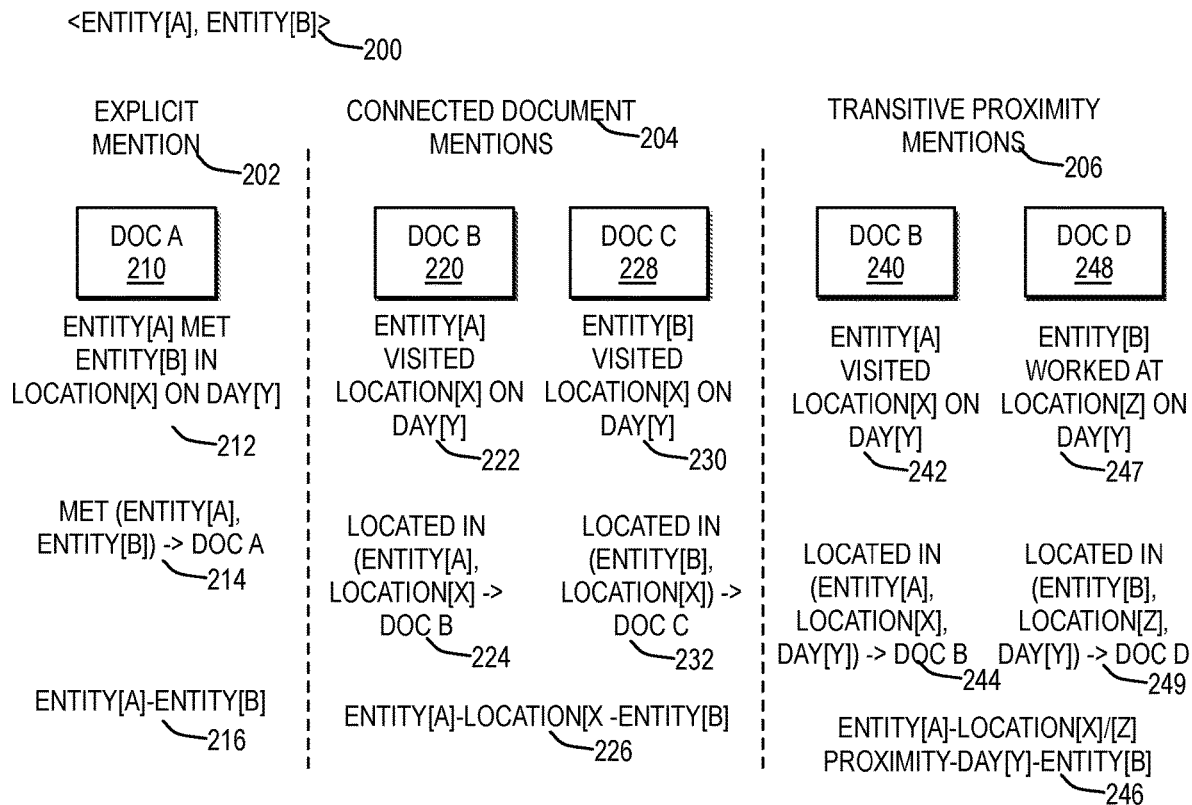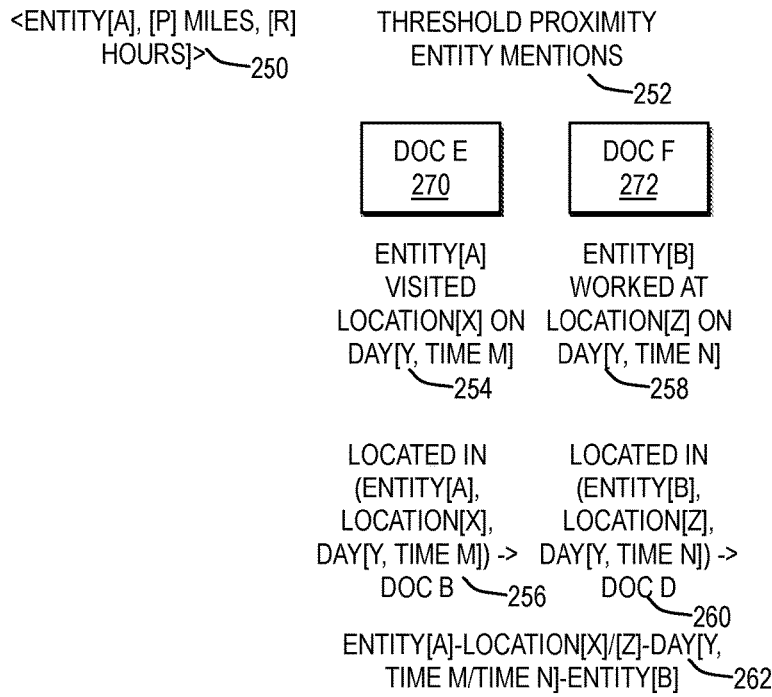
FIG. 2

QUERY : ENTITIES PROXIMATE TO ENTITY A WITHIN
[GEOSPATIAL AND TEMPORAL GRANULARITY] OR — 902
[GEOSPATIAL AND TEMPORAL VALUE]

PROXIMITY MAPPER 904

[GEOSPATIAL AND TEMPORAL GRANULARITY] - > QUERY GEOSPATIAL HASH PREFIX LENGTH = 1 AND TEMPORAL HASH PREFIX LENGTH = 1 — 906

[GEOSPATIAL AND TEMPORAL VALUE] -> QUERY GEOSPATIAL HASH PREFIX= G AND TEMPORAL HASH PREFIX = 8 — 908

TEMPORAL RADIX SORT 910

TEMPORAL HASHES SORTED 2-995(A2) | 3-146(A1) 3-024(B1) 3-543(B2) — 912
30-24(B1) | 31-46(A1) | 35-43(B2) — 914

TEMPORAL OFFSET HASHES SORTED 8-701(A1) 8-550(A2) 8-579 (B1) | 9-098(B2) — 916
87-01(A1) | 85-50(A2) 85-79(B1) — 918
855-0(A2) | 857-9(B1) — 920

TEMPORAL MENTION SELECTOR 922

GRANULARITY MATCH = 3-146(A1) 3-024(B1) 3-543(B2) 8-701(A1) 8-550(A2) 8-579 (B1) — 924
SELECTED MENTIONS NOT INCLUDING QUERY ENTITY = B1, B2 — 926

VALUE MATCH = 8-701(A1) 8-550(A2) 8-579 (B1) — 928
SELECTED MENTIONS NOT INCLUDING QUERY ENTITY = B1 — 930

GEOSPATIAL RADIX SORT 932

THE GEOSPATIAL HASH VALUES OF THE QUERIED AND SELECTED TEMPORAL MENTIONS ARE CONSIDERED
Z-76(B1) | A-35 (A1) A-33(B2) | V-46 (A2) — 934
A-35 (A1) | A-33(B2) — 935

THE GEOSPATIAL OFFSET HASH VALUES OF THE QUERIED AND SELECTED TEMPORAL MENTIONS ARE CONSIDERED
M-12 (A1)| G-72(A2) G-58(B1) — 936
G-72(A2) G-58(B1) — 937

GEOSPATIAL MENTION SELECTOR 940

GRANULARITY MATCH = A-35(A1) A-33(B2) — 942
SELECTED MENTIONS NOT INCLUDING QUERY ENTITY = B2 — 944

VALUE MATCH = G-72 (A2) G-58(B1) — 946
SELECTED MENTIONS NOT INCLUDING QUERY ENTITY = B1 — 948

GEOTEMPORAL RESULTS 950

GRANULARITY MATCH
ENTITY MENTION - B2 — 952

VALUE MATCH
ENTITY MENTION - B1 — 954

*FIG. 9*

QUERY: PROXIMITY OF ENTITY A AND ENTITY B —1000

TEMPORAL RADIX SORT 1002

TEMPORAL HASHES SORTED 2-995(A2) | 3-146(A1) 3-024(B1) 3-543(B2) —1004
30-24(B1) | 31-46(A1) | 35-43(B2) —1006

OFFSET TEMPORAL HASHES SORTED 8-701(A1) 8-550(A2) 8-579 (B1) | 9-098(B2) —1012
87-01(A1) | 85-50(A2) 85-79(B1) —1014
855-0(A2) | 857-9(B1) —1016

TEMPORAL FIND BIN 1018

LONGEST PREFIX = 3 —1020    LONGEST PREFIX = 85 —1022

TEMPORAL CLOSEST SELECTOR 1024   CLOSEST MENTIONS = A2, B1 —1026

TEMPORAL GRANULARITY CALCULATOR 1028   TEMPORAL PROXIMITY = 2 LEVELS OF GRANULARITY —1030

GEOSPATIAL RADIX SORT 1032

GEOSPATIAL HASHES OF THE SELECTED TEMPORAL MENTIONS
V-46(A2) | Z-76(B1) —1034

GEOSPATIAL OFFSET HASHES OF THE SELECTED TEMPORAL MENTIONS
G-72(A2) G-58(B1) —1038
G7-2(A2) | G5-8(B1) —1040

GEOSPATIAL FIND BIN 1042

LONGEST PREFIX = NULL —1044    LONGEST PREFIX = G —1046

GEOSPATIAL CLOSEST SELECTOR 1048   CLOSEST MENTIONS = A2, B1 —1050

GEOSPATIAL GRANULARITY CALCULATOR 1052   GEOSPATIAL PROXIMITY = 1 LEVEL OF GRANULARITY —1054

GEOTEMPORAL RESULTS 1060

TEMPORAL AND GEOSPATIAL PROXIMITY = 2, 1 —1062

*FIG. 10*

ANALYZING GEOTEMPORAL PROXIMITY OF ENTITIES THROUGH A KNOWLEDGE GRAPH

CROSS REFERENCE TO RELATED APPLICATIONS

This application is a continuation of commonly assigned U.S. patent application Ser. No. 16/370,968, filed Mar. 30, 2019, which is hereby incorporated herein by reference.

This invention was made with United States Government support under contract number 2013-12101100008. The Government has certain rights in this invention.

BACKGROUND

1. Technical Field

This invention relates in general to computing systems and more particularly to encoding knowledge graph entries with searchable geotemporal values for evaluating transitive geotemporal proximity of entity mentions.

2. Description of the Related Art

A knowledge graph represents a collection of data extracted from one or more sources about real world entities.

BRIEF SUMMARY

In one embodiment, a method is directed to, generating, by a computer system, a knowledge graph comprising a plurality of entries, each entry comprising a separate entity identifier and a separate entity mention identifier within a separate document of a corpus of a plurality of documents with a located relationship and one or more computed prefix-based geotemporal values determined from geotemporal information associated with the separate entity mention identifier within the separate document. The method is directed to, in response to receiving an input comprising a particular entity and a threshold value, mapping, by the computer system, the threshold value to a geospatial hash prefix type and a temporal hash prefix type. The method is directed to applying, by the computer system, geospatial hash prefix type and the temporal hash prefix type to the plurality of entries in the knowledge graph to determine a response to the input indicating one or more geotemporal proximate entities identified within a degree of geotemporal proximity to the particular entity set by the threshold value.

In another embodiment, a computer system comprises one or more processors, one or more computer-readable memories, one or more computer-readable storage devices, and program instructions, stored on at least one of the one or more storage devices for execution by at least one of the one or more processors via at least one of the one or more memories. The stored program instructions comprise program instructions to generate a knowledge graph comprising a plurality of entries, each entry comprising a separate entity identifier and a separate entity mention identifier within a separate document of a corpus of a plurality of documents with a located relationship and one or more computed prefix-based geotemporal values determined from geotemporal information associated with the separate entity mention identifier within the separate document. The stored program instructions comprise program instructions, in response to receiving an input comprising a particular entity and a threshold value, to map the threshold value to a geospatial hash prefix type and a temporal hash prefix type. The stored program instructions comprise program instructions to apply the geospatial hash prefix type and the temporal hash prefix type to the plurality of entries in the knowledge graph to determine a response to the input indicating one or more geotemporal proximate entities identified within a degree of geotemporal proximity to the particular entity set by the threshold value.

In another embodiment, a computer program product comprises a computer readable storage medium having program instructions embodied therewith, wherein the computer readable storage medium is not a transitory signal per se. The program instructions executable by a computer to cause the computer to generate, by a computer, a knowledge graph comprising a plurality of entries, each entry comprising a separate entity identifier and a separate entity mention identifier within a separate document of a corpus of a plurality of documents with a located relationship and one or more computed prefix-based geotemporal values determined from geotemporal information associated with the separate entity mention identifier within the separate document. The program instructions executable by a computer to cause the computer to, in response to receiving an input comprising a particular entity and a threshold value, map, by the computer, the threshold value to a geospatial hash prefix type and a temporal hash prefix type. The program instructions executable by a computer to cause the computer to apply, by the computer, geospatial hash prefix type and the temporal hash prefix type to the plurality of entries in the knowledge graph to determine a response to the input indicating one or more geotemporal proximate entities identified within a degree of geotemporal proximity to the particular entity set by the threshold value.

BRIEF DESCRIPTION OF THE SEVERAL VIEWS OF THE DRAWINGS

The novel features believed characteristic of one or more embodiments of the invention are set forth in the appended claims. The one or more embodiments of the invention itself however, will best be understood by reference to the following detailed description of an illustrative embodiment when read in conjunction with the accompanying drawings, wherein:

FIG. 2 is a block diagram illustrating examples distinguishing between explicit and proximity-based geotemporal searches supported by a knowledge graph search controller in a knowledge graph with geotemporal encoding.

FIG. 9 is a block diagram illustrating one example of components of a find proximate entity controller identifying entity mentions in a knowledge graph within a threshold proximity to one or more queried entities in a find proximate entity query;

FIG. 10 is a block diagram illustrating one example of components of a find proximity controller identifying the granularity of geospatial and temporal proximity identified in entity mentions for multiple entities identified in a find proximity query;

DETAILED DESCRIPTION

In the following description, for the purposes of explanation, numerous specific details are set forth to provide a thorough understanding of the present invention. It will be apparent, however, to one skilled in the art that the present invention may be practiced without these specific details. In other instances, well-known structures and devices are shown in block diagram form to avoid unnecessarily obscuring the present invention.

In addition, in the following description, for purposes of explanation, numerous systems are described. It is important to note, and it will be apparent to one skilled in the art, that the present invention may execute in a variety of systems, including a variety of computer systems and electronic devices operating any number of different types of operating systems.

Figure 1:
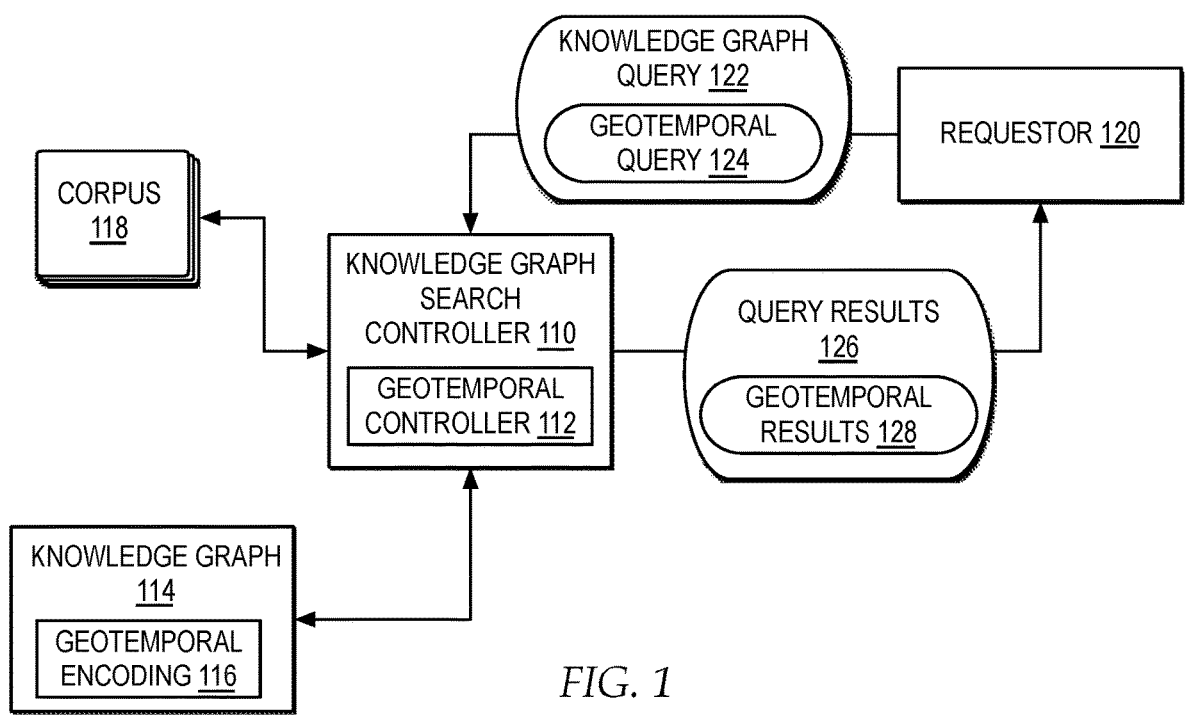
FIG. 1 is block diagram illustrating of one example of a geotemporal search system for supporting geotemporal proximity-based entity searches through a knowledge graph.

FIG. 1 illustrates a block diagram of one example of a geotemporal search system for supporting geotemporal proximity-based entity searches through a knowledge graph.

In one embodiment of the invention, a knowledge graph search controller 110 manages generation of and updates to a knowledge graph 114. In one example, knowledge graph 114 represents a collection of data collected in data records about one or more entities collected from one or more data sources.

In one example, to generate and update knowledge graph 114, knowledge graph search controller 110 searches one or more data sources, collectively referred to as a corpus 118, for mentions of one or more entities. In one example, knowledge graph search controller 110 extracts data from corpus 118, in association with identified mentions of the one or more entities and relationships of the entities, and adds the entity mentions and relationships and extracted data to knowledge graph 114. In one example, knowledge graph search controller 110 adds the entity mentions and relationships and extracted data to knowledge graph 114 in a data record of a tuple.

In one example, an entity represents a thing that exists either physically or logically. For example, an entity may represent one or more of, but not limited to, a real-world person, business, organization, physical object, place, event, thing, or concept. In addition, in one example, a relationship represents how entities are related to one another. For example, a relationship may represent a verb that shows how entities are linked together, such as, but not limited to "located in" or "met".

In one example, corpus 118 includes one or more documents, in one or more formats, types, styles, and languages, accessed from one or more sources. For example, corpus 118 includes online sources such as, but not limited to, social media entries, data generated by sensors and other devices connected in the Internet of Things (IoT) and online encyclopedias, such as, but not limited to, online factbooks, Wikidata, and Wikipedia.

In addition, in one embodiment of the invention, knowledge graph search controller 110 manages searches of knowledge graph 114. In one example, to manage searches of knowledge graph 114, knowledge graph search controller 110 receives search queries, such as knowledge graph query 112 from one or more requestors, such as requestor 120, requesting information about one or more entities in knowledge graph 114. In response to receiving knowledge graph query 112, knowledge graph search controller 110 searches knowledge graph 114 for information related to the one or more entities specified in knowledge graph query 122, determines results of the search of knowledge graph 114, and returns the results of the search as query results 126 to requestor 120.

For example, requestor 120 may enter an entity name and request information about the entity, submitted as knowledge graph query 122. Knowledge graph search controller 110 searches knowledge graph 114 for entries including mentions of the entity in knowledge graph query 122 and returns data collected from entity mentions retrieved from knowledge graph 114 in query requests 126. For example, one tuple entry for a mention of an entity may indicate that the searched entity visited a particular location, such as a particular store name, or may indicate the searched entity met another entity at the particular location, such as a same store name, where each tuple is identified and returned to requestor 120.

In another example of a knowledge graph query, requestor 120 may enter two entity names and request information about what relationships the two entities have in common, submitted as knowledge graph query 122. Knowledge graph search controller 110 searches knowledge graph 114 for tuple entries including each of the entities in knowledge graph query 122 and may determine, for example, which tuple entries for both entities have a relationship of "located in" and a same location, such as a same city. Knowledge graph search controller 110 returns the data collected about the pair of entities of the common "located in" location from knowledge graph 114 in query results 126.

In the example, while the data pointed to by an entry in knowledge graph 114 may include geospatial elements that indicate an entity's location recorded at a particular time, some entities may be transitive in location over time and some entities may be fixed in location over time. It would be advantageous for knowledge graph search controller 110 to also determine, from knowledge graph 114, whether one entity overlaps both in time and location with another entity based on searching entity mentions in knowledge graph 114. In particular, it would be advantageous for knowledge graph search controller to determine, from knowledge graph 114, whether one entity overlaps within a threshold proximity with another entity based on searching entity mentions in knowledge graph 114, when the temporal and geospatial elements recorded in one entity mention do not explicitly match with the temporal and geospatial elements recorded in another entity mention, but are proximate to one another in time and space.

According to an advantage of the present invention, knowledge graph search controller 110 implements a geotemporal controller 112 for supporting and managing geotemporal proximity-based searches through knowledge graph 114. In one example, geotemporal refers to both a temporal element and a geospatial element. In one example, an entity may refer to a person, thing, or other element that is not fixed in position and may be at different places at different times.

In the example, the data pointed to by an entry in knowledge graph 114 may include temporal and geospatial elements recorded in geotemporal encoding 116 for different entity locations at different times. According to an advantage of the invention, geotemporal controller 112 encodes entity and relationship mentions in knowledge graph 114 with geotemporal encoding 116, where geotemporal encoding 116 include prefix-based temporal values and prefix-based geospatial values in association with each entity and relationship. The prefix-based values associated with entity mentions, when compared, indicate degrees of proximity of the entity mentions based on the number of digits of the prefixes shared between the entity mentions. By encoding entity and relationship mentions in knowledge graph 114 with prefix-based geotemporal encoding 116, the temporal and geospatial proximity of entity mentions is stored more efficiently by storing data consolidated into fixed size hash values and is stored more effectively for supporting searches because the data is pre-formatted into a prefix that can be quickly compared bit by bit with other prefixes to evaluate proximity.

According to an advantage of the present invention, a requestor 120 is enabled to specify knowledge graph query 122 with one or more types of geotemporal queries 124. For example, requestor 120 may specify geotemporal query 124 by identifying two or more entities to request a granularity of geotemporal proximity indication of the two or more entities or by identifying one or more entities and a threshold proximity to request identification of other entity mentions within the threshold proximity of the queried entity, as geotemporal proximity-based searches.

According to an advantage of the present invention, in response to a geotemporal query 124 identifying two or more entities, geotemporal controller 112 evaluates, in geotemporal encoding 116 of entity mentions matching the queried entities, what level of granularity in geotemporal proximity is needed to identify the two or more queried entities as overlapping. According to another advantage of the present invention, in response to geotemporal query 124 identifying one or more entities and a threshold proximity, geotemporal controller 112 evaluates, in geotemporal encoding 116 of entity mentions matching the queried entity, other entity mentions with geotemporal encoding within the threshold proximity to the queried entity. In the example, geotemporal controller 112 supports identifying overlapping geotemporal proximity of entity mentions based on explicit text matching and transitive, degree-based matching that is not explicitly identified in matching text, but at a particular granularity there is overlapping geotemporal proximity between entity mentions.

In one example, according to an advantage, geotemporal controller 112 searches knowledge graph 114 for geotemporal query 124, extracts search results from knowledge graph 114 including geotemporal proximity information for entity mentions and granularities of geotemporal proximities identified from geotemporal encoding 116, and returns the search results in query results 126 specified as geotemporal results 128.

In one embodiment of the invention, knowledge graph 114 implements one or more underlying models for describing data within a database, specified to support storage of geotemporal encoding 116. For example, knowledge graph 114 may implement an entity-relationship (ER) model for describing interrelated things of interest, where the model is composed of entity types that classify the things of interest and specifies relationships that can exist between instances of the entity types, and specified to support storage of geotemporal encoding 116. In another example, knowledge graph 114 may implement one or more additional or alternate models including, but not limited to, an RDF data model and a class diagram, specified to support storage of geotemporal encoding 116.

FIG. 2 a block diagram of examples distinguishing between explicit and proximity-based geotemporal searches supported by a knowledge graph search controller in a knowledge graph with geotemporal encoding.

In one example, a user may submit a search query identifying two or more entities in knowledge graph query 122, such as a knowledge graph query of "<entity[A], entity[B]>". In one example, knowledge graph search controller 110, in response to receiving a knowledge graph query identifying multiple entities, may search knowledge graph 114 for mentions of each of the entities and also evaluate the relationships indicated by the mentions of each of the entities. In one example, the relationships indicated by mentions of the entities may include explicitly matching geotemporal data, such as indications of a particular time and place that both entities are named as being located at. In another example, the relationships indicated by mentions of entities may include geotemporal data, but the geotemporal data may not explicitly match exactly, however, according to an advantage of the invention, geotemporal controller 112 evaluates geotemporal encoding 116 to assess transitive geotemporal proximity of entities to indicate location relationships of two or more entities.

In a first example, as illustrated at reference numeral 202, knowledge graph search controller 110 identifies a geotemporal relationship between search entities from explicit mentions of a temporal and geospatial relationship in a single document in knowledge graph 114. For example, as illustrated at reference numeral 202, knowledge graph search controller 110 reads text "entity[A] met entity[B] in location[X] on day[Y]" 212 from a document A (DOC A) 210 and extracts a relationship of "met(entity[A], entity [B])" 214, with a pointer to DOC A 210. Knowledge graph search controller 110 adds the extracted relationship of "met(entity[A], entity[B])" 214 to knowledge graph 114. Subsequently, in response to a query specifying two or more entities, such the query of "<entity[A], entity[B]>" illustrated at reference numeral 200, knowledge graph search controller 110 searches knowledge graph 114 and identifies the direct relationship of "met" of "entity[A]-entity[B]" 216 and returns the result of "met" pointing to DOC A 210 in query results 126. In the example, according to an advantage of the invention, the geotemporal information of "location [X]" and "day[Y]" may also be extracted from DOC A 210, encoded in the entity mention as geotemporal encoding, and returned in the query results as geotemporal results indicating a geotemporal proximity granularity based on an explicit matching time and space of mentions of both entities in a single document.

In a second example, as illustrated at reference numeral 204, knowledge graph search controller 110 identifies geotemporal relationships between search entities from entity mentions with the same explicit geotemporal elements in different documents. For example, as illustrated at reference numeral 204, knowledge graph search controller 110 reads "entity[A] visited location[X] on day[Y]" 222 from document B (DOC B) 220 and extracts a relationship of "located in (entity[A], location[X])" 224, pointing to DOC B 220. In addition, as illustrated at reference numeral 204, knowledge graph search controller 110 reads "entity[B] visited location[X] on day[Y]" 230 from document C (DOC C) 228 and extracts a relationship of "located in (entity[B], location[X])" 232, pointing to DOC C 228. Knowledge graph search controller 110 adds the extracted relationships of "located in (entity[A], location[X])" 224 and "located in (entity[B], location[X])" 232 to knowledge graph 114. Subsequently, in response to a query of knowledge graph 114 with a pair of entities, such as "<entity[A], entity[B]>" 200 in knowledge graph query 122, knowledge graph search controller 110 searches knowledge graph 114 and identifies an indirect relationship of "entity[A]-location[X]-entity[B]" 226 and returns the result of "located in" pointing to DOC B 220 and DOC C 228 in query results 126. In the example, according to an advantage of the invention, both "location [X]" and "day[Y]" data may also be encoded in knowledge graph 114 through geotemporal encoding, and "day[Y]" may also be returned in the query results as geotemporal results indicating a granularity of proximity based on an explicitly matching time and space of mentions of both entities in different documents.

In a third example, according to an advantage of the invention, as illustrated at reference numeral 206, geotemporal controller 112 supports knowledge graph search controller 110 in identifying the granularity of proximity of transitive relational mentions between entities in different documents by evaluating geotemporal encoding 116. For example, as illustrated at reference numeral 206, knowledge graph search controller 110 reads "entity[A] visited location [X] on day[Y]" 242 from document B (DOC B) 240 and geotemporal controller 112 encodes the entity mention with prefix-based geotemporal values with a relationship of "located in (entity[A], location[X], day[Y])" 244, pointing to DOC B 240. In addition, as illustrated at reference numeral 206, knowledge graph search controller 110 reads "entity[B] worked at location[Z] on day[Y]" 242 from document D (DOC D) 247 and geotemporal controller 112 encodes the entity mention with prefix-based geotemporal values with a relationship of "located in (entity[B], location [Z], day[Y])" 249, pointing to DOC D 248. Knowledge graph search controller 110 adds the extracted relationships of "located in (entity[A], location[X], day[Y])" 244 and "located in (entity[B], location[Z], day[Y])" 249 to knowledge graph 114 with geotemporal encoding 116.

Subsequently, in response to the query of "<entity[A], entity[B]>" illustrated at reference numeral 200, geotemporal controller 112 searches the mentions of "entity[A]" and "entity[B]" identified by knowledge graph search controller 110 from knowledge graph 114 for geotemporal tags, identifies the geotemporal tags of "located in (entity[A], location [X], day[Y])" 244 and "located in (entity[B], location[Z], day[Y])" 249 that share a same temporal element and determines what granularity of proximity is needed for location [X] and location [Z] to have overlapped. Knowledge graph search controller 110 returns a transitive relationship of "entity[A]-location[X]/[Z] proximity-day[Y]-entity[B]" 246 identifying the granularity of geospatial proximity between location [X] and location [Z] and returns the result of "located in" pointing to DOC B 240 and DOC D 248 in query results 126. In another example, if the time entry of "day[Y]" has differences in each of the entity mentions, geotemporal controller 112 also determines a granularity of temporal proximity between the different temporal elements.

In a fourth example, according to an advantage of the present invention, as illustrated at reference numeral 206, geotemporal controller 112 supports knowledge graph search controller 110 in identifying entities with transitive relational mentions within a threshold proximity by evaluating geotemporal encoding 116. In one example, in response to knowledge graph query 122 including geotemporal query elements, such as "<entity[A], [P] miles, [R] hours>" as illustrated at reference numeral 250, knowledge graph search controller 110 manages a search for other entities in mentions including geotemporal encoding 116 indicating the granularity of proximity of mentions are within the threshold proximity specified in the query, illustrated by threshold proximity entity mentions 252. For example, as illustrated in the query of "<entity[A], [P] miles, [R] hours>", the threshold proximities are set to a geospatial threshold of "P" miles and a temporal threshold of "R" hours. In the example, knowledge graph search controller 110 reads "entity[A] visited location[X] on day[Y, TIME M]" 254 from document E (DOC E) 270 and geotemporal controller 112 extracts both a temporal tag and geospatial tag of a relationship of "located in (entity[A], location[X], day[Y, TIME M])" 256, pointing to DOC E 270. In addition, in the example, knowledge graph search controller 110 reads "entity[B] worked at location[Z] on day[Y, TIME N]" 258 from document F (DOC F) 272 and geotemporal controller 112 extracts both a temporal tag and geospatial tag of a relationship of "located in (entity[B], location[Z], day[Y, TIME N])" 260, pointing to DOC F 272. Knowledge graph search controller 110 adds the extracted relationships of "located in (entity[A], location[X], day[Y, TIME M])" 256 and "located in (entity[B], location[Z], day[Y, TIME N])"

260 to knowledge graph 114, where records with both a temporal tag and a geospatial tag are identified through geotemporal encoding 116.

Subsequently, in response to the query of "<entity[A], [P] miles, [R] hours>" illustrated at reference numeral 250, geotemporal controller 112 searches the mentions of "entity [A]", "entity[B]", and other entities identified by knowledge graph search controller 110 from knowledge graph 114 for geotemporal encoding. Geotemporal controller 112 identifies the geotemporal encoding within "located in (entity[A], location[X], day[Y, TIME M])" 256 and "located in (entity [B], location[Z], day[Y, TIME N])" 260, determines whether the time granularity difference between "TIME [M]" and "TIME [N]" meets the threshold proximity of "[R] hours", and if so, also determines whether the distance granularity difference between "location [X]" and "location [Z]" meets the threshold proximity of "[P] miles". Knowledge graph search controller 110 returns a transitive relationship of "entity[A]–location[X]/[Y] proximity–day[Y]–entity[B]" 246 if the temporal mentions meet the temporal threshold and the geospatial mentions meet the geospatial threshold, returning the mention of "entity [B]" pointed to in DOC F 272 in query results 126. By identifying and returning indications of entity mentions that are within a threshold proximity of a searched entity, knowledge graph search controller 110 provides information about transitive, proximity-based geotemporal relationships of entities, in addition to providing information about explicit geotemporal relationships of entities.

Figure 3:
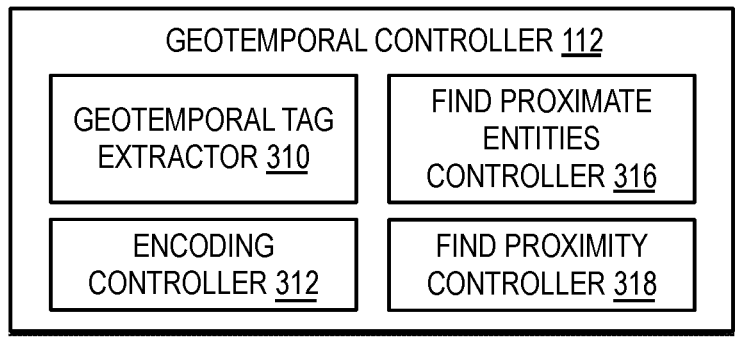
FIG. 3 is a block diagram illustrating one example of a geotemporal controller for supporting geotemporal proximity-based entity searches in a knowledge graph.

FIG. 3 is a block diagram of one example of a geotemporal controller for supporting geotemporal proximity-based entity searches in a knowledge graph.

In one example, geotemporal controller 112 includes a geotemporal tag extractor 310. As knowledge graph search controller 110 finds entity mentions within corpus 118, geotemporal tag extractor 310 identifies temporal and geospatial elements associated with the entity mentions within corpus 118 to support knowledge graphic search controller 110 in generating knowledge graph 114 with prefix-based geotemporal values identified with entity mentions in geotemporal encoding 116.

For example, geotemporal tag extractor 310 identifies temporal elements such as, but not limited to, a numerical time, a date, a day of the week, a season, a time period, an event, and other indicators of a particular point in time or range of times. For example, geotemporal tag extractor 310 identifies geospatial elements such as, but not limited to, a geographic area, a store name, a business name, a street name, location coordinates, an event name, and other indicators of a particular location or a location scope.

In one example, geotemporal controller 112 includes an encoding controller 312 for encoding all mentions of each entity in knowledge graph 114 with geotemporal encoding 116 by considering the temporal locality of a mention as identified by geotemporal tag extractor 310. Next, encoding controller 312 calculates a temporal hash or other prefix-based temporal encoding of the mention and calculates a second prefix-based temporal offset hash to address time edges by applying an offset mask to the temporal hash, such that proximate times that do not share a prefix in the temporal hash may share a prefix in the temporal offset hash. Encoding controller 312 adds the entity mention with geotemporal encoding 116 including the temporal hash and temporal offset hash.

In addition, encoding controller 312 encodes all mentions of each entity in knowledge graph with geotemporal encoding by considering the geospatial locality of the mention as identified by geotemporal tag extractor 310. Next, encoding controller 312 calculates a geospatial hash value, such as a geohash, or other prefix-based geospatial encoding of the mention and calculates a second prefix-based geospatial offset hash value to address location edges by rotating longitudinal and latitudinal coordinates of the geospatial hash value by 90 degrees to capture locations around an alternate edge of a bounded area. Encoding controller 312 adds the entity mention, with geotemporal encoding 116 including the geospatial hash and geospatial offset hash, to knowledge graph 114.

In the example, each hash value represents a mapping of temporal or geospatial data into a fixed size, with a fixed length prefix of the hash stored as the hash value. When a hash function is applied to temporal or geospatial data, the prefixes of hashes of events that are similar in time share similar prefix digits and events that are similar in space share similar prefix digits. In the example, to accommodate for prefix edge locations that may not overlap, the offset mask is applied to create the temporal offset hash and the rotation value is applied to create the geospatial hash provide offset prefixes. The number of digits shared between prefixes provides an indicator of the degree of granularity of temporal or geospatial proximity.

In one example, geotemporal controller 112 includes a find proximate entities controller 316. In one example, find proximate entities controller 316 manages geotemporal query 124 including a "find proximate entities" type query that identifies one or more entities and a geospatial and temporal threshold proximity.

In the example, find proximate entities controller 316 first performs a mapping. In one example, the mapping includes mapping the geospatial and temporal threshold proximities identified in the query from granularity-based thresholds to a geospatial hash prefix length and a temporal hash prefix length or from time and value-based thresholds to a geospatial hash prefix and a temporal hash prefix.

Next, find proximate entities controller 316 radix sorts all mentions of the queried entities and non-queried entities on each of the mention temporal hashes, by most significant digit. For bins that share a temporal hash prefix matching the threshold prefix or hash prefix of length matching the threshold prefix length and include a queried entity, find proximate entities controller 316 identifies all entity mentions in these bins that are different from the query entities as a first selection of entity mentions. Next, find proximate entities controller 316 radix sorts all mentions of the queried entities and the first selection of entity mentions on each of the mention geospatial hashes, by most significant digit. For bins that share a geospatial hash prefix matching the threshold prefix or hash prefix of length matching the threshold prefix length and include a queried entity, find proximate entities controller 316 identifies all entity mentions in these bins that are different from the query entities as a second selection of entity mentions. Find proximate entities controller 316 returns the second selection of entity mentions to knowledge graph search controller 110 for specifying geotemporal results 128 of query results 126.

In one example, geotemporal controller 112 includes a find proximity query controller 318. In one example, find proximity controller 318 manages geotemporal query 124 including a "find proximity" query identifying two or more entities. Find proximity controller 318 radix sorts all mentions of the queried entities on each of the mention temporal hashes, by most significant digit. For bins with longest prefix that contain a mention for each of the queried entities, find proximity controller 318 identifies the entity mentions as temporal closest mentions and identifies the length of the prefix of the temporal closest mentions as the temporal proximity. Next, find proximity controller 318 radix sorts all mentions of the closest mentions on each of the mention geospatial hashes, by most significant digit. For bins with a longest prefix that contain a mention for each of the queried entities, find proximity controller 318 identifies these entity mentions as a geospatial closest mentions and identifies the length of the prefix of the geospatial closest mentions as the geospatial proximity. Find proximity controller 318 may map the temporal proximity to a smallest temporal measure, such as a year, week or day, and returns the mapped temporal proximity. Next, find proximity controller 318 may map the geospatial proximity to a shortest geospatial measure, such as mile or foot, and returns the mapped geospatial proximity for specifying geotemporal results 128 of query requests 126. If the geospatial prefix of the geospatial closest mentions maps to a named geographic entity, such as a city, country, or location identified in a record of knowledge graph 114 or another mapping source, then find proximity controller 318 may also identify and return the named geographic entity for specifying geotemporal results 128 of query results 126.

In one example, find proximity controller 318 may generate data points for a mapped representation the area described by the geospatial prefix of the geospatial closest mentions and the time described by the temporal prefix of the temporal closest mentions on a map projection and a timeline. In one example, to generate the map projection and timeline, find proximity controller 318 determines a mapping location by identifying the latitude and longitude coordinates identified by the geospatial prefix by determining a bounding box of the area for the selected geospatial prefix and then determining the coordinates mapped to in the bounding box for the selected geospatial prefix. If the geospatial prefix is the offset value, then find proximity controller 318 also reverses the latitudinal and longitudinal rotations of the coordinates for the geospatial offset hash value identified in the bounding box.

Figure 4:
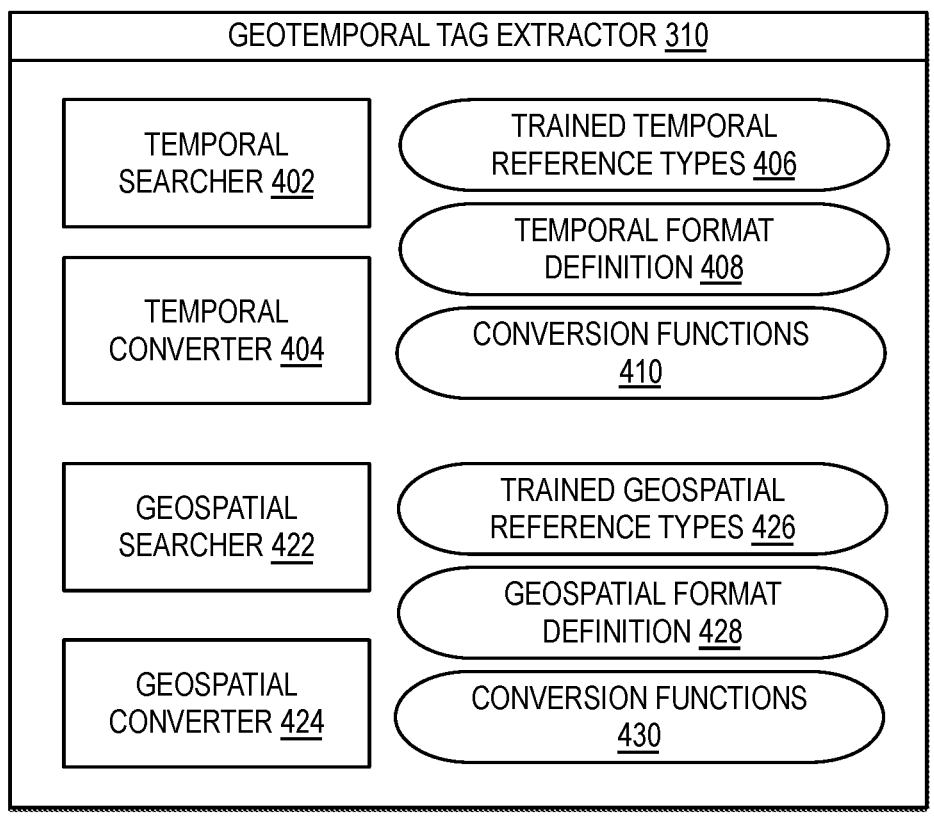
FIG. 4 is a block diagram illustrating one example of components of a geotemporal tag extractor for extracting geotemporal data associated with entity mentions in documents, for entry in a knowledge graph.

FIG. 4 illustrates a block diagram of one example of components of a geotemporal tag extractor for extracting geotemporal data associated with entity mentions in documents, for entry in a knowledge graph.

In the example, geotemporal tag extractor 310 includes a temporal searcher 402 for searching the contents of a document with an entity mention for one or more types of temporal data associated with a location relationship, such as trained temporal reference types 406. In searching the contents of the document with an entity mention for one or more types of temporal data, temporal searcher 402 may also search metadata of the document, such as a timestamp indicating when a document was created or accessed, for indications of temporal data associated with an entity mention. Trained temporal reference types 406 may include, but are not limited to, numerical time references, date references, calendar day references, seasonal references, time period references, event references, and other references to indicators of a particular point in time or range of times. In one example, temporal searcher 402 may implement one or more types of trained classifiers that are trained to classify the temporal content of text based on trained temporal reference types 406. In another example, temporal searcher 402 may extract potential temporal values by parsing data using a temporal library and may extract start and end times by daily, weekly, monthly, quarterly, and yearly identifiers, for example.

In the example, geotemporal tag extractor 310 also includes a temporal converter 404 for converting temporal data identified by temporal searcher 402 to meet one or more temporal format definitions in temporal format definition 408. For example, temporal format definition 408 may specify a UTC based time format. In another example, temporal format definition 408 may specify a time format for categorizing temporal data in association with a datetime and timespan or year/month/time. In the example, temporal converter 404 may apply one or more conversion functions 410 to convert the one or more temporal reference types into the one or more temporal format definitions for encoding as an extracted temporal tag.

In the example, geotemporal tag extractor 310 includes a geospatial searcher 422 for searching the contents of a document with an entity mention for one or more types of geospatial data, such as trained geospatial reference types 426. Trained geospatial reference types 426 may include, but are not limited to, geographic or space references such as, but not limited to, geographic area references, store name references, business name references, street name references, location coordinate references, event name references, and other references to indicators of a particular location or a location area.

In one example, geospatial searcher 422 may implement one or more types of trained classifiers that are trained to classify the geospatial content of text based on trained geospatial reference types 426. For example, geospatial searcher 422 may implement classifiers trained with millions of geographic names of countries, cities, regions, and cities, which assigns unique geographic identifiers to each identified geographic name. In another example, geospatial searcher 422 may implement classifiers trained with street level information, which assigns unique geographic identifiers to each identified address or way. In another example, geospatial searcher 422 may implement classifiers trained with postal codes and country codes, which assigns unique geographic identifiers to each identified postal code or country code. In one example, geospatial searcher 402 may implement classifiers trained with temporal event and historical period information, which assigns unique geographic identifiers to events and historical periods indicators.

In the example, geotemporal tag extractor 310 also includes a geospatial converter 424 for converting geospatial data identified by geospatial searcher 422 to meet one or more geospatial format definitions in geospatial format definition 428. For example, geospatial format definition 428 may specify a latitude and longitude or address-based format. In the example, geospatial converter 424 may apply one or more conversion functions 420 to convert the one or more geospatial reference types into the one or more geospatial format definitions for encoding as an extracted geospatial tag.

Figure 5:
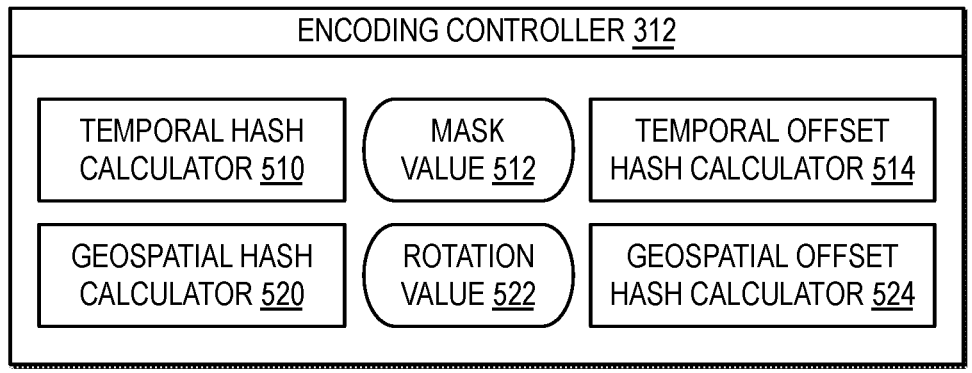
FIG. 5 is a block diagram illustrating one example of components of an encoding controller for generating prefix-based geotemporal encoding values from entity mentions in documents for entry in a knowledge graph.

FIG. 5 illustrates a block diagram of one example of components of an encoding controller for generating prefix-based geotemporal encoding values from entity mentions in documents for entry in a knowledge graph.

In one example, encoding controller 312 includes a temporal hash calculator 510 for calculating a prefix-based temporal hash value from the temporal tag extracted by geotemporal tag extractor 310. In one example, temporal hash calculator 510 may apply one or more types of full-length hash functions to the temporal tag and then compute the hash prefix of the most significant selection of a fixed size, such as 4-32 bytes as the prefix-based temporal hash value. In the example, each bit of the hash prefix of the prefix-based temporal hash value, starting from most significant bit, when compared with the same bit of other hash prefixes, indicates a degree of granularity of temporal proximity of the prefix-based temporal hash value to other prefix-based temporal hash values, as an indicator of temporal proximity of entity mentions including the compared prefix-based temporal hash values.

In addition, in one example, encoding controller 312 includes a temporal offset hash calculator 514 for applying a mask value 512 to the prefix-based temporal hash value to calculate a temporal offset hash value, in order to accommodate for temporal edges. In one example, each bit of the hash prefix of the prefix-based temporal offset hash value from most significant bit, when compared with the same bit of other offset hash values, indicates a degree of temporal proximity of the prefix-based temporal offset hash value to other prefix-based temporal offset hash values, as an indicator temporal proximity of entity mentions including the compared prefix-based temporal hash values. For example, a temporal hash prefix length match of 1 may reflect a proximity of within 100 hours, a temporal hash prefix length match of 2 may reflect a proximity of within 10 hours, a temporal hash prefix length match of 3 may reflect a proximity of within 1 hour, and a temporal hash prefix length match of 4 may reflect a proximity of within 1 minute.

In one example, in general, mask value 512 is set to a value to increase or decrease each significant digit of a temporal hash value by half of the digit's potential value, so two proximate terms that span time edges will be centralized in the range. For example, two events separated by a day may not share a prefix when hashed into temporal hash values, such as the dates of 1999 Dec. 31 and 2000 Jan. 1, which are separated by a day, but may not share a hash prefix because the hashed values of the different year and month values would not normalize to matching hash prefixes. By applying mask value 512 with a half interval mask value to increase each digit of the hash by half of its potential value, a new set of offset hashes may be created which would effectively reflect the dates of 2000 Jun. 15 and 2000 Jun. 16 with matching hash prefixes indicating a proximity of 1 day. In another example, if the temporal hash value represents a seconds-since-epoch temporal representation, then mask value 512 may apply a decimal offset of "55555555555" to apply a half interval mask to increase each digit of the hash by half of its potential value.

In the example, encoding controller 312 includes a geospatial hash calculator 520 for calculating a prefix-based geospatial hash value from the geospatial tag extracted by geotemporal tag extractor 310. In one example, geospatial hash calculator 520 may calculate a prefix-based geospatial hash value based on a geocoding system that encodes a geospatial location, such as a latitude and longitude or address, into a particular hashed short string of letters and digits. In one example, the prefix-based geospatial hash value may represent a geohash or other prefix-based geospatial hash value. In one example, the geocoding system applied by geospatial hash calculator 520 may apply a hierarchical spatial data structure that subdivides space into buckets of grid shapes, as applied by a space-filling curve, such as a Z-order curve. In one example, each bit of the hash prefix of the geospatial hash reflects a degree of precision or granularity of proximity. The proximity of locations to one another is generally reflected by the number of prefix digits shared by the geospatial hashes, where the more shared digits between two prefixes starting from most significant digit, the closer the two locations are that identified by the prefixes.

By calculating a geospatial hash value for encoding with an entity mention, the geospatial data encoded with the entity mention in a knowledge graph has all points for a given rectangular area in contiguous slices, in a single value for minimizing data storage, and the prefix can be quickly compared to other geospatial hash values in other entity mentions to determine proximity. For example, a geospatial hash prefix length match of 1 may reflect a proximity of within 2500 kilometers (km), a geospatial hash prefix length match of 2 may reflect a proximity of within 630 km, a geospatial hash prefix length match of 3 may reflect a proximity of within 78 km, a geospatial hash prefix length match of 4 may reflect a proximity of within 20 km, a geospatial hash prefix length match of 5 may reflect a proximity of within 2.4 km, a geospatial hash prefix length match of 6 may reflect a proximity of within 0.61 km, a geospatial hash prefix length match of 7 may reflect a proximity of within 0.076 km, and a geospatial hash prefix length match of 8 may reflect a proximity of within 0.019 km. In additional or alternate embodiments, each geospatial hash prefix length match may reflect proximity of alternate distances or other geospatial proximity measurements.

In addition, in the example, encoding controller 312 includes a geospatial offset hash calculator 524 for calculating a prefix-based geospatial offset hash value from the geospatial hash value by applying a rotation value 522. In the example, while geospatial hashes may reflect points in proximity to each other based on common prefixes, edge case locations close to each other but on opposite sides of the 180-degree meridian will have different longitudes for physical locations that are proximate, but have different prefixes. To identify points in proximity to each other on edge case locations, geospatial offset hash calculator 524 rotates the latitudinal and longitudinal coordinates by rotation value 522, such as 90 degrees, and calculates a prefix-based geospatial offset hash value based on the rotated coordinates. In the example, the prefix-based geospatial hash value may represent one corner of a bounding box around a location and the prefix-based geospatial offset hash value may represent another corner of the bounding box.

Figure 6:
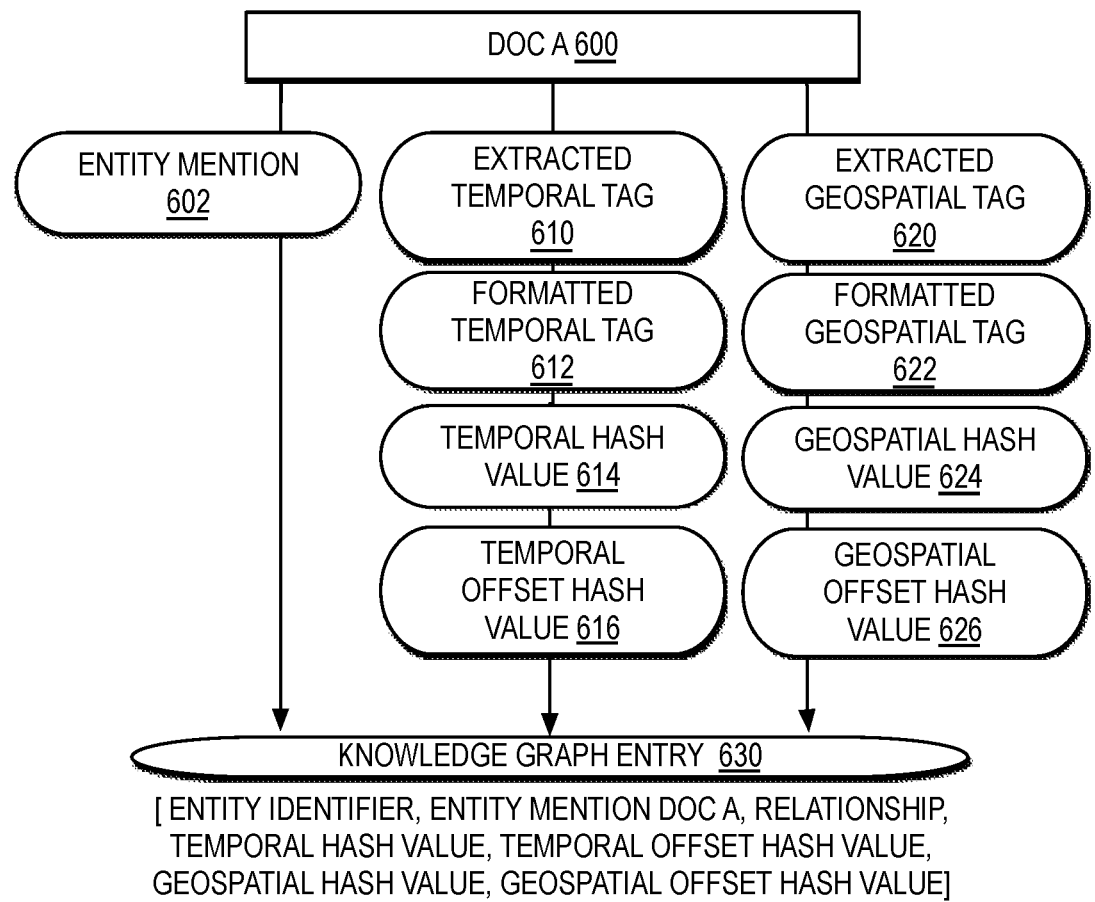
FIG. 6 is a block diagram illustrating one example of the geotemporal data extracted in associated with a location relationship to entity mention and encoded in a knowledge graph.

FIG. 6 illustrates a block diagram of one example of the geotemporal data extracted in associated with a location relationship to entity mention and encoded in a knowledge graph.

In one example, knowledge graph search controller 110 evaluates document A (DOC A) 600 for location relationship mentions of a particular entity, including geotemporal location relationship mentions. In the example, knowledge graph search controller 110 identifies an entity mention 602 for a particular entity identifier.

In the example, temporal searcher 402 of geotemporal tag extractor 310 extracts an extracted temporal tag 610 from DOC A 600. Temporal converter 404 of geotemporal tag extractor 310 formats extracted temporal tag 610 to output formatted temporal tag 612. Temporal hash calculator 510 of encoding controller 312 calculates a temporal hash value 614 based on formatted temporal tag 612. Temporal offset hash calculator 514 applies mask value 512 to temporal hash value 614 to create a temporal offset hash value 616. In addition, geospatial searcher 422 of geotemporal tag extractor 310 extracts an extracted geospatial tag 620 from DOC A 600. Geospatial converter 424 of geotemporal tag extractor 310 formats extracted temporal tag 610 to output formatted geospatial tag 622. Geospatial hash calculator 520 of encoding controller 312 calculates a geospatial hash value 624 based on formatted geospatial tag 622. Geospatial offset hash calculator 524 applies rotation value 522 to geospatial hash value 624 to create a geospatial offset hash value 626.

In the example, knowledge graph search controller 110 adds a knowledge graph entry 630 with an entity identified in entity mention 602 in an "entity identifier", the pointer to DOC A 600 in entity mention 602 in an "entity mention doc A", and a relationship indicator of "located at" as "relationship". In addition, geotemporal controller 112 encodes knowledge graph entry 630 with temporal hash value 614, temporal offset hash value 616, geospatial hash value 624, and geospatial offset hash value 626 as respectively illustrated by "temporal hash value, temporal offset hash value, geospatial hash value, and geospatial offset hash value."

Figure 7:
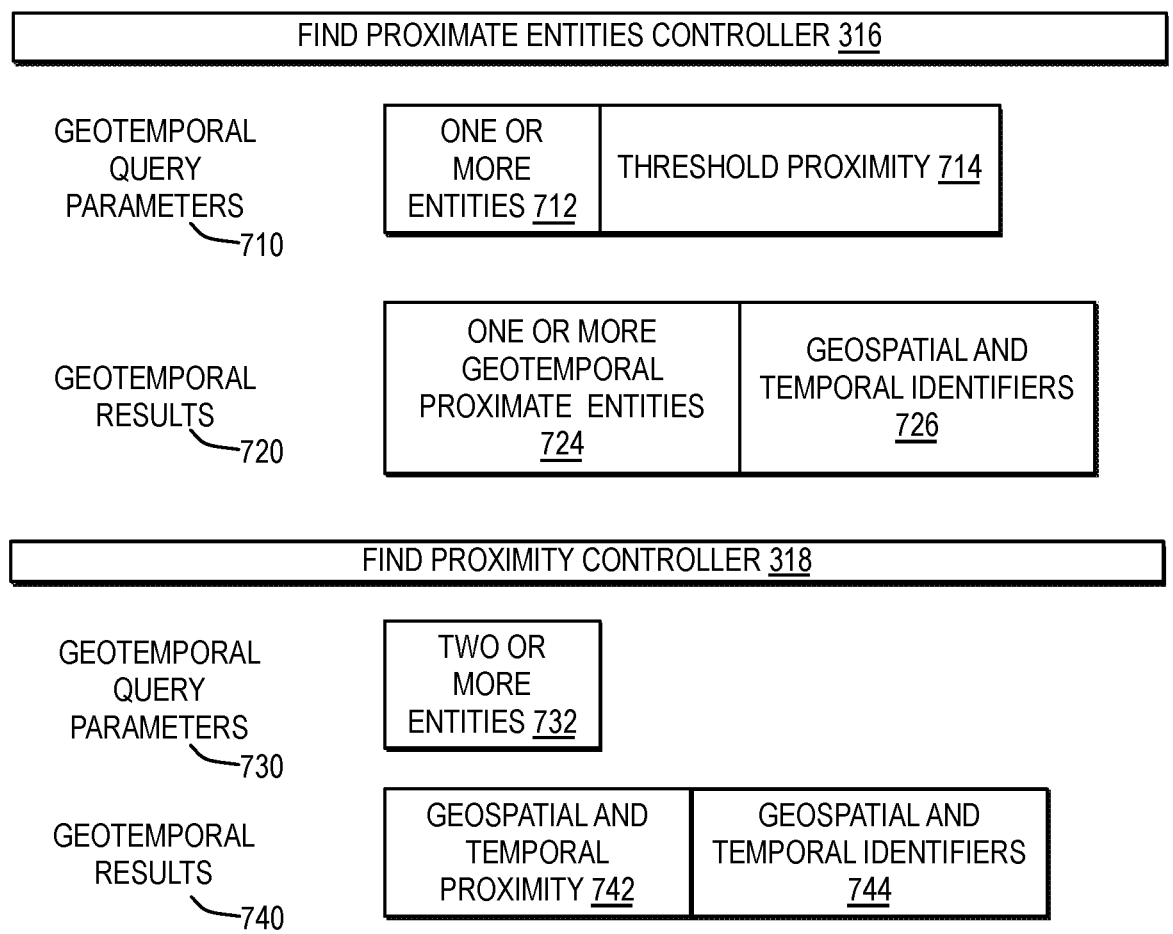
FIG. 7 is a block diagram illustrating one example of parameters received by and results produced by a geotemporal controller for supporting geotemporal proximity-based entity searches in a knowledge graph.

FIG. 7 illustrates a block diagram of one example of parameters received by and results produced by a geotemporal controller for supporting geotemporal proximity-based entity searches in a knowledge graph.

In one example, find proximate entities controller 316 supports a query of geotemporal query parameters 710 including one or more entities 712 and a threshold proximity 714 to define a search for records in knowledge graph 114 including the one or more entities 712 overlapping in location and time as bound by threshold proximity 714. In one example, threshold proximity 714 includes one or more of a geospatial granularity, a temporal granularity, a specific geospatial value, and a specific temporal value.

In one example, in response to a query with geotemporal query parameters 710, find proximate entities controller 316 produces geotemporal results 720 that specify one or more geotemporal proximate entities 724 identified in entity mentions in knowledge graph 114 as overlapping in proximity with the entities specified in one or more entities 712, as bound by threshold proximity 714. In addition, geotemporal results 720 may identify one or more geospatial and temporal identifiers 726 identifying the particular locations and times identified as overlapping in proximity for the queried entities.

In one example, find proximity controller 318 supports a query of geotemporal query parameters 730 including two or more entities 732 to define a search for records in knowledge graph 114 including the multiple entities identified in two or more entities 732 overlapping in location and time.

In one example, in response to a query with geotemporal query parameters 730, find proximity controller 318 produces geotemporal results 740 of geospatial and temporal proximity 742 indicating a time granularity and location granularity identified for the multiple queried entities to overlap in proximity based on entity mentions within knowledge graph 114. In addition, geotemporal results 740 may identify one or more geospatial and temporal identifiers 744 identifying the particular locations and times identified as overlapping in proximity in the identified entity mentions.

Figure 8:
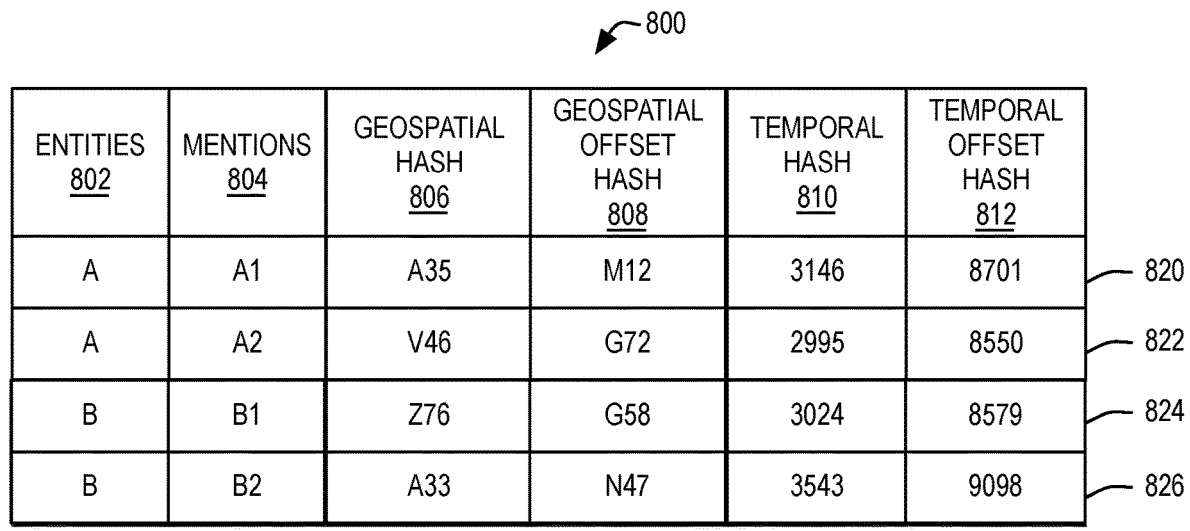
FIG. 8 is a block diagram illustrating an example of entries collected from a knowledge graph with geotemporal encoding for a find proximity query.

FIG. 8 illustrates a block diagram of an example of entries collected from a knowledge graph with geotemporal encoding for a find proximity query.

In one example, a table 800 includes entries 820, 822, 824, and 826, each representing a tuple or other data record in a knowledge graph. In the example, entries 820 and 822 represent knowledge graph entries for "entity A" and entries 824 and 826 represent knowledge graph entries for "entity B".

In particular, in the example, each entry in table 800 identifies an entity 802, a mention identifier 804 of a document and geotemporal encoding elements of a geospatial hash 806, a geospatial offset geohash 808, a temporal hash 810, and a temporal offset hash 812. For example, entry 820 identifies an "entity A", a mention in document "A1", a geospatial hash of "A35", a geospatial offset hash of "M12", a temporal hash of "3146", and a temporal offset hash of "8701". Entry 822 also identifies an entry for "entity A", with a mention in document "A2", a geospatial hash of "V46", a geospatial offset hash of "G72", a temporal hash of "2995", and a temporal offset hash of "8550". In addition, in the example, entry 824 identifies an entry for a different entity of "entity B", with a mention in document "B1", a geospatial hash of "Z76", a geospatial offset hash of "G58", a temporal hash of "3024", and a temporal offset hash of "8579". Entry 826 also identifies an entry for "entity B", with a mention in document "B2", a geospatial hash of "A33", a geospatial offset hash of "N47", a temporal hash of "3543", and a temporal offset hash of "9098".

FIG. 9 illustrates a block diagram of one example of components of a find proximate entity controller identifying entity mentions in a knowledge graph within a threshold proximity to one or more queried entities in a find proximate entity query.

In one example, find proximate entities controller 316 receives a find proximate entities query, such as find proximate entities query 900 that specifies a search for entities proximate to "entity [A]" and within a threshold proximity specified by a geospatial and temporal granularity or a geospatial and temporal value. Find proximate entities controller 316 identifies a selection of one or more entries from knowledge graph 114 for one or more queried entities and one or more non-queried entities, such as the entries in table 800.

To evaluate which entity mentions are proximate to "entity[A]" with the threshold proximity based on the entity mentions retrieved from knowledge graph 114 in table 800, find proximate entities controller 316 applies a proximity mapper 904 that maps the threshold proximity depending on the type of threshold proximity. For example, if the threshold proximity in a search query specifies a geospatial and temporal granularity, then proximity mapper 904 maps the geospatial and temporal granularity to a respective geospatial hash prefix length, such as "1", and a respective temporal hash prefix length, such as "1", as illustrated at reference numeral 906. In another example, if the threshold proximity in a search query specifies a geospatial and temporal value, then proximity mapper 904 maps the geospatial and temporal value to a respective geospatial hash prefix, such as "G", and a respective temporal hash prefix, such as "8", as illustrated at reference numeral 908.

In the example, find proximate entities controller 316 applies a temporal radix sort 910, which sorts the temporal hashes of the mentions returned for queried and non-queried entities in table 800 into bins until the queried entities do not share a bin, or, in another example, until all the bins reach the same length as the threshold prefix length. In the example, temporal radix sort 910 performs a first level of sorting illustrated at reference numeral 912 based on the most significant digit of each temporal hash illustrated by a first bin with "2-995" for mention "A2" and a second bin with "3-146" for mention "A1", 3-024 for mention "B1", and "3-543" for mention "B2". In the example, the "1" divider in the illustration identifies a division between bins. In the example, since multiple entities share the second bin at reference numeral 912, temporal radix sort 910 performs a second level of sorting of the second bin based on the first two most significant digits of each temporal hash as illustrated at reference numeral 914 by a first bin of "30-24" for mention "B1", a second bin of "31-46" for mention "A1", and a third bin of "35-43" for mention "B2".

In the example, temporal radix sort 910 also sorts the temporal offset hashes of the mentions returned for queried and non-queried entities in table 800 into bins until the queried entities do not share a bin, or in another example, until all the bins reach the same length as the threshold prefix length. In the example, temporal radix sort 910 performs a first level of sorting illustrated at reference numeral 916 based on the most significant digit of each temporal offset hash illustrated by a first bin with "8-701" for mention "A1", "8-550" for mention "A2", and "8-579" for mention "B1" and a second bin with "9-098" for mention "B2". In the example, since multiple entities share the first bin at reference numeral 916, temporal radix sort 910 performs a second level of sorting of the first bin based on the first two most significant digits of each temporal offset hash as illustrated at reference numeral 918 by a first bin with "87-01" for mention "A1" and a second bin with "85-50" for mention "A2" and "85-79" for mention "B1". In the example, since multiple entities share the first bin at reference numeral 918, temporal radix sort 910 performs a third level of sorting of the second bin based on the first three most significant digits of each temporal offset hash as illustrated at reference numeral 920 by a first bin with "855-0" for mention "A2" and a second bin with "857-9" for mention "B1".

In the example, find proximate entities controller 316 includes a temporal mention selector 922, which identifies one or more select bins including the queried elements that each share a temporal hash prefix the same length as the threshold mapping prefix length and identifies all entity mentions that are different from the one or more query entities, as selected entity mentions. For example, temporal mention selector 922 identifies the mentions with a granularity matching the threshold prefix length of "1" of "3-146 (A1)", "3-024(B1)", "3-543(B2)", "8-701(A1)", "8-550 (A2)", and 8-579(B1)", as illustrated at reference numeral 924, and from among the entity mentions, identifies entity mentions "B1" and "B2" as selected mentions that do not include the queried entity, as illustrated at reference numeral 926.

In addition, in the example, temporal mention selector 922 identifies one or more select bins including the queried elements that each share a temporal hash value matching the threshold mapping prefix and identifies all entity mentions that are different from the one or more query entities, as selected entity mentions. For example, temporal mention selector 922 identifies the mentions with a value matching the threshold prefix of "8" of "8-701(A1)", "8-550(A2)", and 8-579(B1)", as illustrated at reference numeral 928, and from among the entity mentions, identifies entity mention "B1" as a selected mention that does not include the queried entity, as illustrated at reference numeral 930.

Next, find proximate entities controller 316 includes a geospatial radix sort 932, which sorts the geospatial hash values of the mentions returned for each queried entity and the selected temporal mentions from table 800 into bins until the queried entities do not share a bin. In the example, geospatial radix sort 932 performs a first level of sorting illustrated at reference numeral 934 based on the most significant digit of each geospatial hash illustrated by a first bin with "Z76" for mention "B1", a second bin with "A-35" for mention "A1" and "A-33" for mention "B2" and a third bin with "V46" for mention "A2". Next, geospatial radix sort 932 performs a second level of sorting of the second bin as illustrated at reference numeral 935 based on the two most significant digit of each geospatial hash illustrated by a first bin with "A-35" for mention "A1" and a second bin with "A-33" for mention "B2". As illustrated at reference numeral 935, no entities share a bin after the second level of sorting.

In the example, geospatial radix sort 932 also sorts the geospatial offset hash values of the mentions returned for each queried entity and the selected temporal mentions from table 800 into bins until the queried entities do not share a bin. In the example, geospatial radix sort 932 performs a first level of sorting illustrated at reference numeral 936 based on the most significant digit of each geospatial hash of the temporal closest mentions, by a first bin with an geospatial offset hash of "M-12" for mention "A1", a second bin with "G-72" for mention "A2" and "G-58" for mention "B1". In the example, since multiple entities share the second bin at reference numeral 936, geospatial radix sort 932 performs a second level of sorting of the bin based on the first two most significant digits of each geospatial offset hash values, as illustrated at reference numeral 937 by a first bin of "G7-2" for mention "A2" and a second bin of "G5-8" for mention "B1". As illustrated at reference numeral 937, no entities share a bin after the second level of sorting.

In the example, find proximate entities controller 316 includes a geospatial mention selector 940, which identifies a second selection of one or more select bins including the queried elements that each share a geospatial hash prefix the same length as the threshold mapping prefix length and identifies all entity mentions that are different from the one or more query entities, as selected entity mentions. For example, geospatial mention selector 940 identifies the mentions with a granularity matching the threshold prefix length of "1" of "A-35(A1)" and "A-33(B2)", as illustrated at reference numeral 942, and from among the entity mentions, identifies entity mentions "B2" as a selected mention that does not include the queried entity, as illustrated at reference numeral 944.

In addition, in the example, geospatial mention selector 922 identifies a second selection of one or more select bins including the queried elements that each share a geospatial hash value matching the threshold mapping prefix and identifies all entity mentions that are different from the one or more query entities, as selected entity mentions. For example, geospatial mention selector 940 identifies the mentions with a value matching the threshold prefix of "G" of "G-72(A1)" and "G-58(B1)" as illustrated at reference numeral 946, and from among the entity mentions, identifies entity mention "B1" as a selected mention that does not include the queried entity, as illustrated at reference numeral 948.

In the example, find proximate entities controller 316 provides geotemporal results 950 based on the geospatial selected mentions selected by geospatial mention selector 940, depending on the type of threshold proximity provided in the search query. For example, if the type of threshold proximity is a granularity threshold, geotemporal results 950 include the granularity matching entity mention of "B2", as illustrated at reference numeral 952. In another example, if the type of threshold proximity is a value threshold, geotemporal results 950 include the value matching entity mention of "B1", as illustrated at reference numeral 954.

FIG. 10 illustrates a block diagram of one example of components of a find proximity controller identifying the granularity of geospatial and temporal proximity identified in entity mentions for multiple entities identified in a find proximity query.

In one example, find proximity controller 318 receives a find proximity query, such as find proximity query 1000 and identifies a selection of one or more entries from knowledge graph 114 for each of the entities, such as the entries in table 800. To evaluate the granular proximity of "entity[A]" and "entity[B]" based on the entity mentions retrieved from knowledge graph 114 in table 800, find proximity controller 318 applies a temporal radix sort 1002, which sorts the temporal hash values of the mentions returned for each entity in table 800 into bins until the queried entities do not share a bin. In the example, temporal radix sort 1002 performs a first level of sorting illustrated at reference numeral 1004 based on the most significant digit of each temporal hash illustrated by a first bin with "2-995" for mention "A2" and a second bin with "3-146" for mention "A1", "3-024" for mention "B1", and "3-543" for mention "B2". In the example, the "|" divider in the illustration identifies a division between bins. In the example, since multiple entities share the second bin at reference numeral 1004, temporal radix sort 1002 performs a second level of sorting of the second bin based on the first two most significant digits of each temporal hash value as illustrated at reference numeral 1006 by a first bin with "30-24" for mention "B1", a second bin with "31-46" for mention "A1", and a third bin with "35-43" for mention "B2".

In the example, find proximity controller 318 includes a temporal find bin 1018, which identifies the bin that contains a mention for each of the queried entities for the temporal hash value with the longest prefix and then assigns the longest prefix for each of the mentions as the temporal prefix. In the example, for the temporal hash sorting, the second bin illustrated at reference numeral 1004 is the bin with the longest prefix that contains a mention for each of the queried entities, illustrated by mention "A1", mention "B1", and mention "B2". As illustrated at reference numeral 1020, for the temporal hash sorting, temporal find bin 1018 returns the longest prefix of the bin that contains a mention for each of the queried entities identified with a longest prefix value "3", of a length of 1 digit.

In addition, in one example, temporal radix sort 1002 sorts the temporal offset hashes of the mentions returned for each entity in table 800 into bins until the entities do not share a bin. In the example, temporal radix sort 1002 performs a first level of sorting illustrated at reference numeral 1012 based on the most significant digit of each temporal offset hash illustrated by a first bin with "8-701" for mention "A1", "8-550" for mention "A2", and "8-579" for mention "B1" and a second bin with "9-098" for mention "B2". In the example, since multiple entities share the first bin at reference numeral 1012, temporal radix sort 1002 performs a second level of sorting of the first bin based on the first two most significant digits of each temporal offset hash, as illustrated at reference numeral 1014, by a first bin with "87-01" for mention "A1" and a second bin with "85-50" for mention "A2" and "85-79" for mention "B1". In the example, since multiple entities share the second bin at reference numeral 1014, temporal radix sort 1002 performs a third level of sorting of the second bin based on the first three most significant bits of each temporal offset hash illustrated at reference numeral 1016 by a first bin with "855-0" for mention "A2" and a second bin with "857-9" for mention "B1".

In the example, temporal find bin 1018 identifies the bin that contains a mention for each of the queried entities for the temporal offset hash with the longest prefix and then assigns the longest prefix for each of the mentions as the temporal offset prefix. In the example, for the temporal offset hash sorting, the second bin illustrated at reference numeral 1014 is the bin with a longest prefix that contains a mention for each of the queried entities, illustrated by mention "A2" and mention "B1". As illustrated at reference numeral 1022, for the temporal offset hash sorting, temporal find bin 1018 returns the longest prefix of the bin that contains a mention for each of the queried entities identified with a longest prefix value "85", of a length of 2 digits.

In the example, find proximity controller 318 includes a temporal closest selector 1024. Temporal closest selector 1024 evaluates whether the temporal hash or the temporal offset hash has the longest prefix length. In the example, the temporal offset hash longest prefix of "85" illustrated at reference numeral 1022 is longer than the temporal hash longest prefix of "3" illustrated at reference numeral 1020. Temporal closest selector 1024 identifies the closest entity mentions in the bins for the selected longest prefix of "85", which are identified as illustrated at reference numeral 1026 as mentions "A2" and "B1" from the second bin illustrated at reference numeral 1014.

In the example, find proximity controller 318 includes a temporal granularity calculator 1028. Temporal granularity calculator 1028 evaluates the temporal proximity indicated for the closest mentions based on the prefix length. In the example, as illustrated at reference numeral 1030, temporal granularity calculator determines that the 2-digit prefix of "85" reflects a temporal proximity of two levels of granularity, which, for example, may reflect a temporal proximity within 100 hours.

Next, find proximity controller 318 includes a geospatial radix sort 1032, which sorts the geospatial hashes of the mentions returned for each entity in table 800 into bins until the queried entities do not share a bin. In the example, geospatial radix sort 1032 performs a first level of sorting illustrated at reference numeral 1034 based on the most significant digit of each geospatial hash illustrated by a first bin with "V46" for mention "A2" and a second bin with "Z76" for mention "B1". As illustrated at reference numeral 1034, no entities share a bin after the first level of sorting.

In the example, find proximity controller 318 includes a geospatial find bin 1042, which identifies the bin that contains a mention for each of the queried entities for the geospatial hash with the longest prefix and then assigns the longest prefix for each of the mentions as the geospatial offset prefix. In the example, for the geospatial hash sorting, no bin contains a mention for each of the queried entities, therefore geospatial find bin 1042 returns a null prefix for the longest prefix, as illustrated at reference numeral 1044.

In the example, geospatial radix sort 1032 also sorts the geospatial offset hashes of the mentions returned for each entity in table 800 into bins until the queried entities do not share a bin. In the example, geospatial radix sort 1032 performs a first level of sorting illustrated at reference numeral 1038 based on the most significant digit of each geospatial hash of the temporal closest mentions, illustrated at reference numeral 1038 by a single bin with "G-72" for mention "A2" and a second bin with "G-58" for mention "B1". In the example, since multiple entities share the first bin at reference numeral 1038, geospatial radix sort 1032 performs a second level of sorting of the bin based on the first two most significant digits of each geospatial offset hash, as illustrated at reference numeral 1040 by a first bin of "G7-2" for mention "A2" and a second bin of "G5-8" for mention "B1". As illustrated at reference numeral 1040, no entities share a bin after the second level of sorting.

In the example, geospatial find bin 1042 also identifies the bin that contains a mention for each of the queried entities for the geospatial offset hash with the longest prefix and then assigns the longest prefix for each of the mentions as the geospatial offset prefix. In the example, for the geospatial offset hash sorting, the first bin illustrated at reference numeral 1038 is the bin with a longest prefix that contains a mention for each of the queried entities, illustrated by mention "A2" and mention "B1". As illustrated at reference numeral 642, for the geospatial offset hash sorting, geospatial find bin 1042 returns the longest prefix of the bin that contains a mention for each of the queried entities identified with a longest prefix of "G".

In the example, find proximity controller 318 includes a geospatial closest selector 1048. Geospatial closest selector 1048 evaluates whether the geospatial hash or the geospatial offset hash has the longest prefix length. In the example, the length of the geospatial offset hash longest prefix of "G" illustrated at reference numeral 1046 is longer than the length of the geospatial hash longest prefix of "null" illustrated at reference numeral 1044. Geospatial closest selector 1048 identifies the entity mentions in the bins for the selected longest prefix length of "G", which are identified as illustrated at reference numeral 1050 as mentions "A2" and "B1" from the first bin illustrated at reference numeral 1038.

In the example, find proximity controller 318 includes a geospatial granularity calculator 1052. Geospatial granularity calculator 1052 evaluates the geospatial proximity indicated for the closest mentions based on the prefix length. In the example, as illustrated at reference numeral 1054, geospatial granularity calculator 1052 determines that the 1-digit prefix of "G" reflects a geospatial proximity of one level of granularity, which for example, may reflect a temporal proximity within 630 km.

In the example, find proximity controller 318 provides geotemporal results 1060 based on the temporal proximity illustrated at reference numeral 1030 and from the geospatial proximity illustrated at reference numeral 1054. In one example, geotemporal results 1060 may be reported as the prefix lengths, as indications of proximity, as illustrated at reference numeral 1062. In another example, find proximity controller 318 may first convert each prefix length into a measurement, such as converting a temporal prefix length to an amount of time and a geospatial prefix length to a distance, and report the measurement in geotemporal results 1060.

Figure 11:
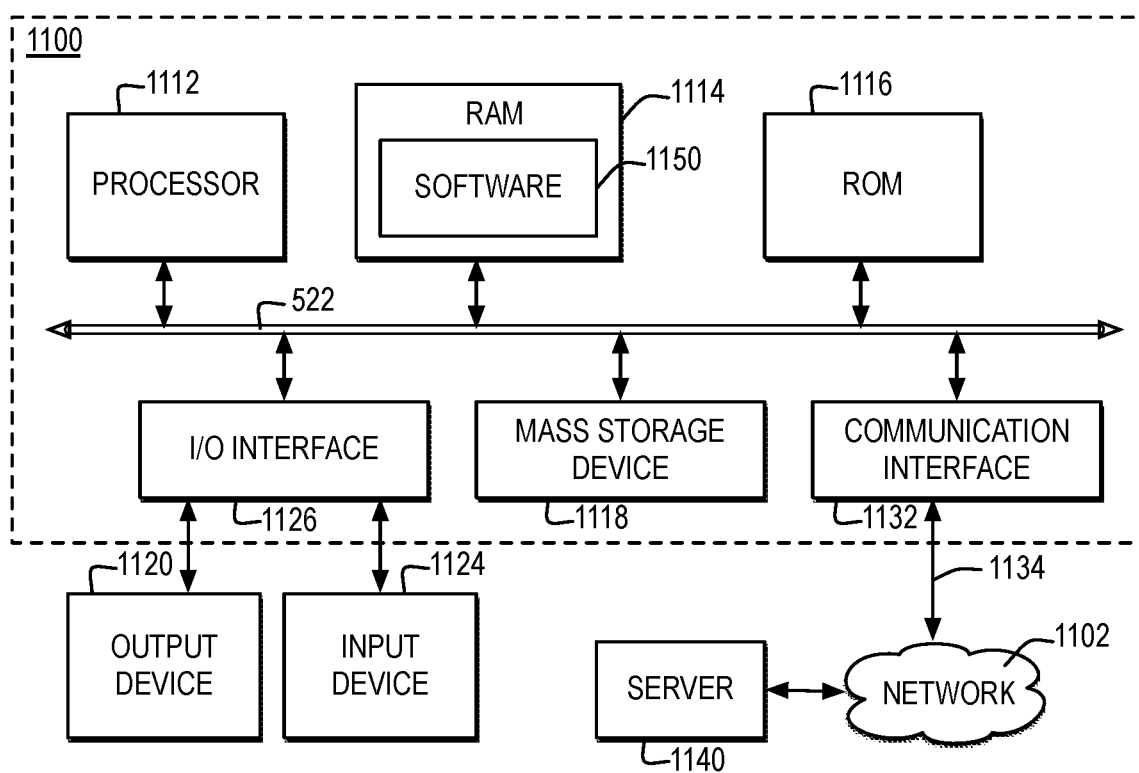
FIG. 11 is a block diagram of one example of a computer system in which one embodiment of the invention may be implemented.

FIG. 11 illustrates a block diagram of one example of a computer system in which one embodiment of the invention may be implemented. The present invention may be performed in a variety of systems and combinations of systems, made up of functional components, such as the functional components described with reference to a computer system 1100 and may be communicatively connected to a network, such as network 1102.

Computer system 1100 includes a bus 1122 or other communication device for communicating information within computer system 1100, and at least one hardware processing device, such as processor 1112, coupled to bus 1122 for processing information. Bus 1122 preferably includes low-latency and higher latency paths that are connected by bridges and adapters and controlled within computer system 1100 by multiple bus controllers. In one embodiment, when implemented as a server or node, computer system 1100 includes multiple processors designed to improve network servicing power.

In one embodiment, processor 1112 is at least one general-purpose processor that, during normal operation, processes data under the control of software 1150, which includes at least one of application software, an operating system, middleware, and other code and computer executable programs accessible from a dynamic storage device such as random access memory (RAM) 1114, a static storage device such as Read Only Memory (ROM) 1116, a data storage device, such as mass storage device 1118, or other data storage medium. In one embodiment, software 1150 includes, but is not limited to, code, applications, protocols, interfaces, and processes for controlling one or more systems within a network including, but not limited to, an adapter, a switch, a server, a cluster system, and a grid environment.

In one embodiment, computer system 1100 communicates with a remote computer, such as server 1140, or a remote client. In one example, server 1140 is connected to computer system 1100 through any type of network, such as network 1102, through a communication interface, such as network interface 1132, or over a network link connected, for example, to network 1102.

In one embodiment, multiple systems within a network environment are communicatively connected via network 1102, which is the medium used to provide communications links between various devices and computer systems communicatively connected. Network 1102 includes permanent connections such as wire or fiber optics cables and temporary connections made through telephone connections and wireless transmission connections, for example, and may include routers, switches, gateways and other hardware to enable a communication channel between the systems connected via network 1102. Network 1102 represents one or more of packet-switching based networks, telephony-based networks, broadcast television networks, local area and wire area networks, public networks, and restricted networks.

Network 1102 and the systems communicatively connected to computer 1100 via network 1102 implement one or more layers of one or more types of network protocol stacks which may include one or more of a physical layer, a link layer, a network layer, a transport layer, a presentation layer, and an application layer. For example, network 1102 implements one or more of the Transmission Control Protocol/Internet Protocol (TCP/IP) protocol stack or an Open Systems Interconnection (OSI) protocol stack. In addition, for example, network 1102 represents the worldwide collection of networks and gateways that use the TCP/IP suite of protocols to communicate with one another. Network 1102 implements a secure HTTP protocol layer or other security protocol for securing communications between systems.

In the example, network interface 1132 includes an adapter 1134 for connecting computer system 1100 to network 1102 through a link and for communicatively connecting computer system 1100 to server 1140 or other computing systems via network 1102. Although not depicted, network interface 1132 may include additional software, such as device drivers, additional hardware and other controllers that enable communication. When implemented as a server, computer system 1100 may include multiple communication interfaces accessible via multiple peripheral component interconnect (PCI) bus bridges connected to an input/output controller, for example. In this manner, computer system 1100 allows connections to multiple clients via multiple separate ports and each port may also support multiple connections to multiple clients.

In one embodiment, the operations performed by processor 1112 control the operations of flowchart of FIGS. 12-16 and other operations described herein. In one embodiment, operations performed by processor 1112 are requested by software 1150 or other code or the steps of one embodiment of the invention might be performed by specific hardware components that contain hardwired logic for performing the steps, or by any combination of programmed computer components and custom hardware components. In one embodiment, one or more components of computer system 1100, or other components, which may be integrated into one or more components of computer system 1100, contain hardwired logic for performing the operations of flowcharts in FIGS. 12-16.

In one embodiment, computer system 1100 includes multiple peripheral components that facilitate input and output. These peripheral components are connected to multiple controllers, adapters, and expansion slots, such as input/output (I/O) interface 1126, coupled to one of the multiple levels of bus 1122. For example, input device 1124 includes, for example, a microphone, a video capture device, an image scanning system, a keyboard, a mouse, or other input peripheral device, communicatively enabled on bus 1122 via I/O interface 1126 controlling inputs. In addition, for example, output device 1120 communicatively enabled on bus 1122 via I/O interface 1126 for controlling outputs include, for example, one or more graphical display devices, audio speakers, and tactile detectable output interfaces, but in another example also includes other output interfaces. In alternate embodiments of the present invention, additional or alternate input and output peripheral components may be added.

With respect to FIG. 11, the one or more embodiments present invention including, but are not limited to, a system, a method, and/or a computer program product. In one embodiment, the computer program product includes a computer readable storage medium (or media) having computer readable program instructions thereon for causing a processor to carry out aspects of the present invention.

In one embodiment, the computer readable storage medium is a tangible device that can retain and store instructions for use by an instruction execution device. The computer readable storage medium includes, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. In one embodiment, the network comprises copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

In one embodiment, computer readable program instructions for carrying out operations of the present invention include one or more of assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. In one embodiment, the computer readable program instructions execute entirely on the user's computer, partly on the user's computer, as a stand-alone software package, partly on the user's computer and partly on a remote computer or entirely on the remote computer or server. In the latter scenario, in one example, the remote computer is connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Those of ordinary skill in the art will appreciate that in additional or alternate embodiments, the hardware depicted in FIG. 11 may vary. Furthermore, those of ordinary skill in the art will appreciate that the depicted example is not meant to imply architectural limitations with respect to the present invention.

Figure 12:
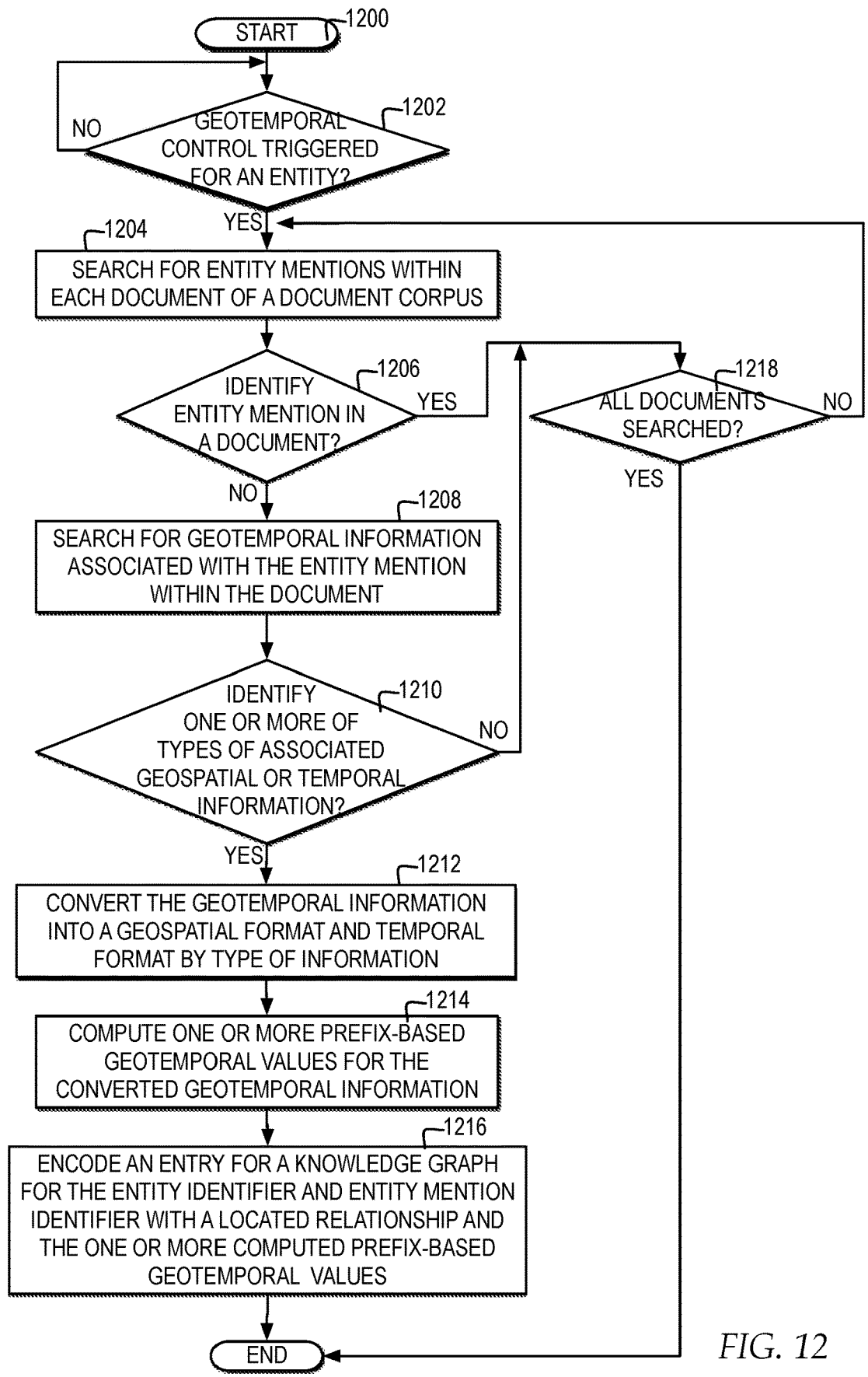
FIG. 12 illustrates a high-level logic flowchart of a process and computer program for encoding entity mentions in a knowledge graph with geotemporal information in the mentions in a format for supporting transitive proximity-based entity searching through the knowledge graph.

FIG. 12 illustrates a high-level logic flowchart of a process and computer program for encoding entity mentions in a knowledge graph with geotemporal information in the mentions in a format for supporting transitive proximity-based entity searching through the knowledge graph.

In the example, the process and computer program start at block 1200 and thereafter proceeds to block 1202. Block 1202 illustrates a determination whether geotemporal control is triggered for an entity. At block 1202, if geotemporal control is triggered for an entity, then the process passes to block 1204. Block 1204 illustrates searching for entity mentions within each document of a document corpus. Next, block 1206 illustrates a determination whether an entity mention is identified in a document.

At block 1206, if an entity mention is not identified in a document, then the process passes to block 1218. Block 1218 illustrates a determination whether all documents are searched. At block 1218, if all documents are searched, then the process ends. Otherwise, at block 1218, if all documents have not been searched, then the process returns to block 1204.

Returning to block 1206, at block 1206, if an entity mention is identified in a document, then the process passes to block 1208. Block 1208 illustrates searching for geotemporal information associated with the entity mention with in the document. Next, block 1210 illustrates a determination whether one or more types of associated geospatial or temporal information is identified. At block 1210, if no geospatial or temporal information is identified, then the process passes to block 1218. At block 1210, if one or more types of geospatial or temporal information is identified, then the process passes to block 1212. Block 1212 illustrates converting the geotemporal information into one or more geospatial and temporal formats by type of information. Next, block 1214 illustrates computing one or more prefix-based geotemporal values for the converted geotemporal information, such as one or more prefix-based hash and offset hash values for the converted geotemporal information. Thereafter, block 1216 illustrates encoding an entry for a knowledge graph for the entity mention and entity mention identifier with a located relationship and the one or more computed prefix-based geotemporal values, and the process ends.

Figure 13:
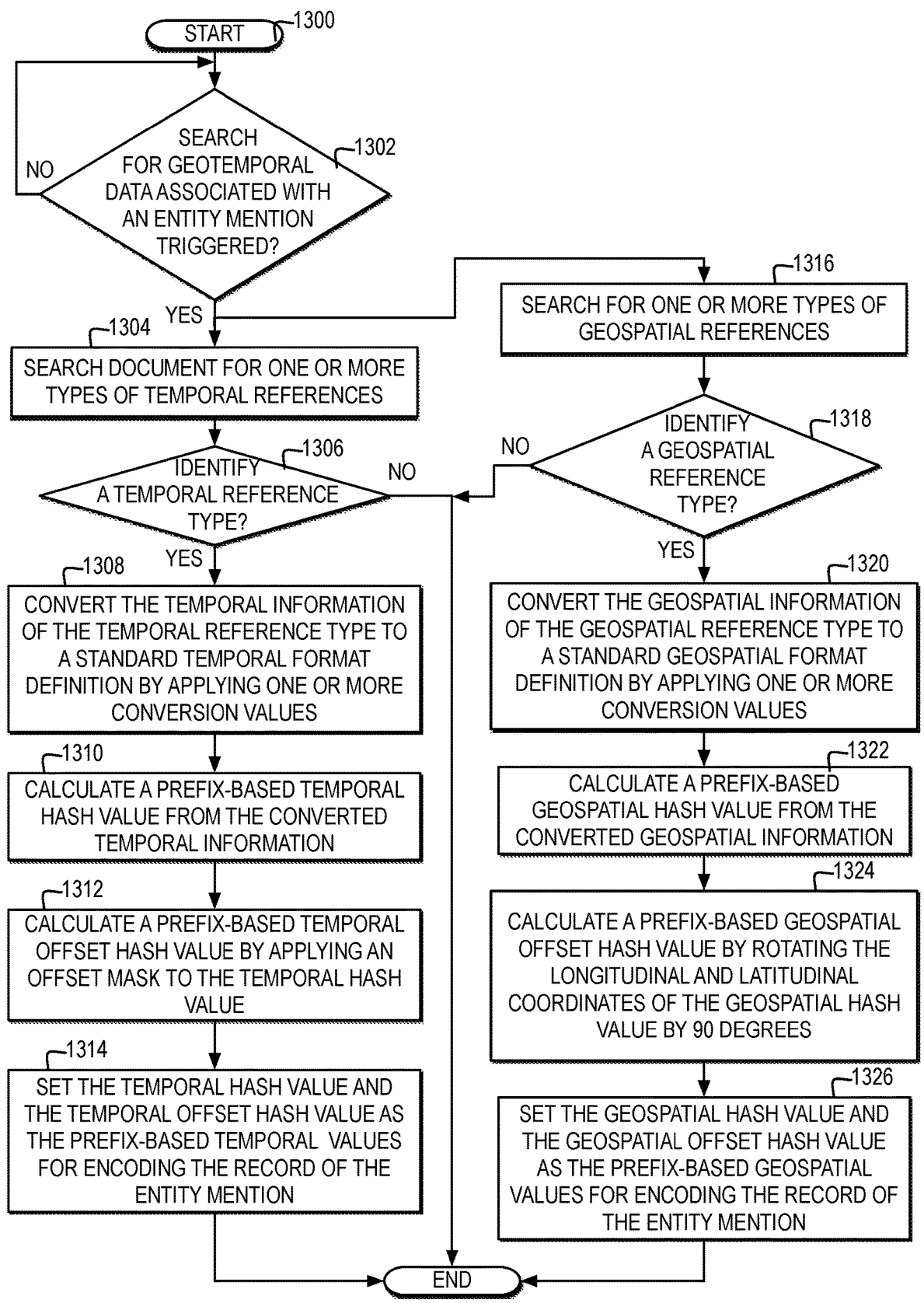
FIG. 13 illustrates a high-level logic flowchart of a process and computer program for identifying and encoding geotemporal data associated with entity mentions as prefix-based geotemporal values in a knowledge graph for supporting proximity-based entity searching through the knowledge graph.

FIG. 13 illustrates a high-level logic flowchart of a process and computer program for identifying and encoding geotemporal data associated with entity mentions as prefix-based geotemporal values in a knowledge graph for supporting proximity-based entity searching through the knowledge graph.

In one example, the process and computer program start at block 1300 and thereafter proceeds to block 1302. Block 1302 illustrates a determination whether a search for geotemporal data associated with an entity mention is triggered. At block 1302, if a search for geotemporal data associated with an entity mention is triggered, then the process passes concurrently to block 1304 and to block 1316.

Block 1304 illustrates searching a document for one or more types of temporal references. Next, block 1306 illustrates a determination whether a temporal reference type is identified. At block 1306, if no temporal reference type is identified, then the process ends. At block 1306, if a temporal reference type is identified, then the process passes to block 1308. Block 1308 illustrates converting the temporal information of the temporal reference type to a standard temporal format definition, such as a coordinated universal time (UTC), by applying one or more conversion values. Next, block 1310 illustrates calculating a prefix-based temporal hash value from the converted temporal information. Thereafter, block 1312 illustrates calculating a prefix-based temporal offset hash value by applying an offset mask to the temporal hash value. Next, block 1314 illustrates setting the temporal hash value and the temporal offset hash value as the prefix-based temporal values for encoding the record of the entity mention, and the process ends.

Block 1316 illustrates searching for one or more types of geospatial references. Next, block 1318 illustrates a determination whether a geospatial reference type is identified. At block 1318, if no geospatial reference type is identified, then the process ends. At block 1318, if a geospatial reference type is identified, then the process passes to block 1320. Block 1320 illustrates converting the geospatial information of the geospatial reference type to a standard geospatial format definition, such as a latitude and longitude, by applying one or more conversion values. Next, block 1322 illustrates calculating a prefix-based geospatial hash value from the converted geospatial information. Thereafter, block 1324 illustrates calculating a prefix-based geospatial offset hash value by rotating the latitudinal and longitudinal coordinates of the geospatial hash value by 90 degrees. Next, block 1326 illustrates setting the geospatial hash value and the offset geospatial hash value as the geotemporal tag values for the geospatial information for the entity mention, and the process ends.

Figure 14:
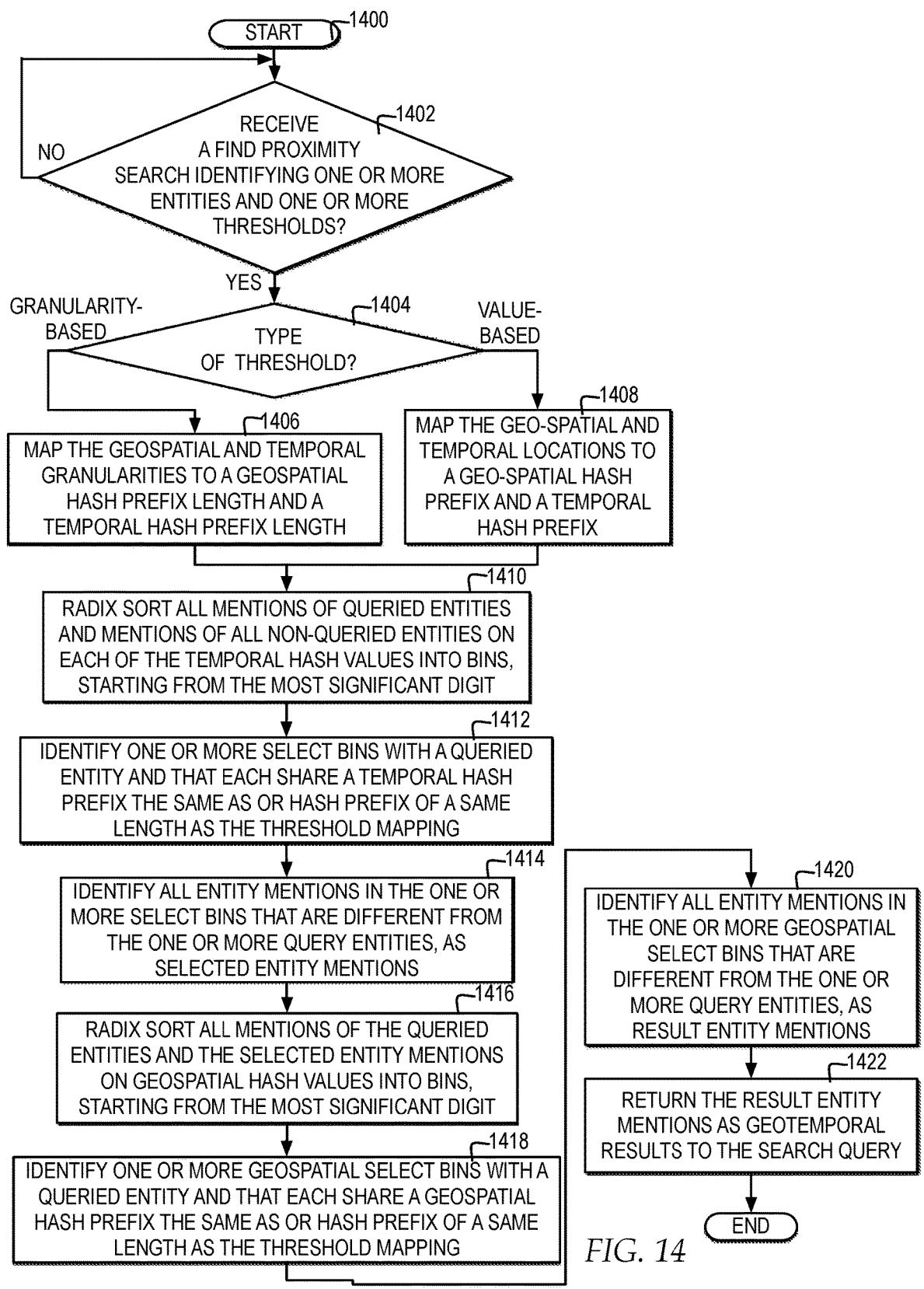
FIG. 14 illustrates a high-level logic flowchart of a process and computer program for performing transitive proximity-based entity searching to find mentions of other entities within a threshold proximity of the search entity through the knowledge graph.

FIG. 14 illustrates a high-level logic flowchart of a process and computer program for performing transitive proximity-based entity searching to find mentions of other entities within a threshold proximity of the search entity through the knowledge graph.

In one example, the process and computer program start at block 1400 and thereafter proceeds to block 1402. Block 1402 illustrates a determination whether a find proximity search is received identifying one or more entities and one or more thresholds. At block 1402, if a find proximity search is received identifying one or more entities and one or more thresholds, then the process passes to block 1404.

Block 1404 illustrates a determination of what type of threshold is specified. At block 1404, if the threshold is granularity-based, then the process passes to block 1406. Block 1406 illustrates mapping the geospatial and temporal granularities to a geospatial hash prefix length and a temporal hash prefix length, and the process passes to block 1410. Returning to block 1404, if the threshold is value-based, then the process passes to block 1408. Block 1408 illustrates mapping the geospatial and temporal locations to a geospatial hash prefix and a temporal hash prefix, and the process passes to block 1410.

Block 1410 illustrates radix sorting all mentions of queried entities and all mentions of non-queried entities on each of the temporal hash values into bins starting from the most significant digit. Next, block 1412 illustrates identifying one or more select bins with a queried entity that each share a temporal hash prefix the same as or hash prefix of a same length as the threshold mapping. Thereafter, block 1414 illustrates identifying all entity mentions in the one or more select bins that are different from the one or more query entities, as selected entity mentions. Next, block 1416 illustrates radix sorting all mentions of the queried entities and the selected entity mentions on geospatial hash values into bins starting from the most significant digit. Thereafter, block 1418 illustrates identifying one or more geospatial select bins with a queried entity that each share a geospatial hash prefix the same as or hash prefix of a same length as the threshold mapping. Next, block 1420 illustrates identifying all entity mentions in the one or more geospatial select bins that are different from the one or more query entities, as result entity mentions. Thereafter, block 1422 illustrates returning the result entity mentions as geotemporal results to the search query, and the process ends.

Figure 15:
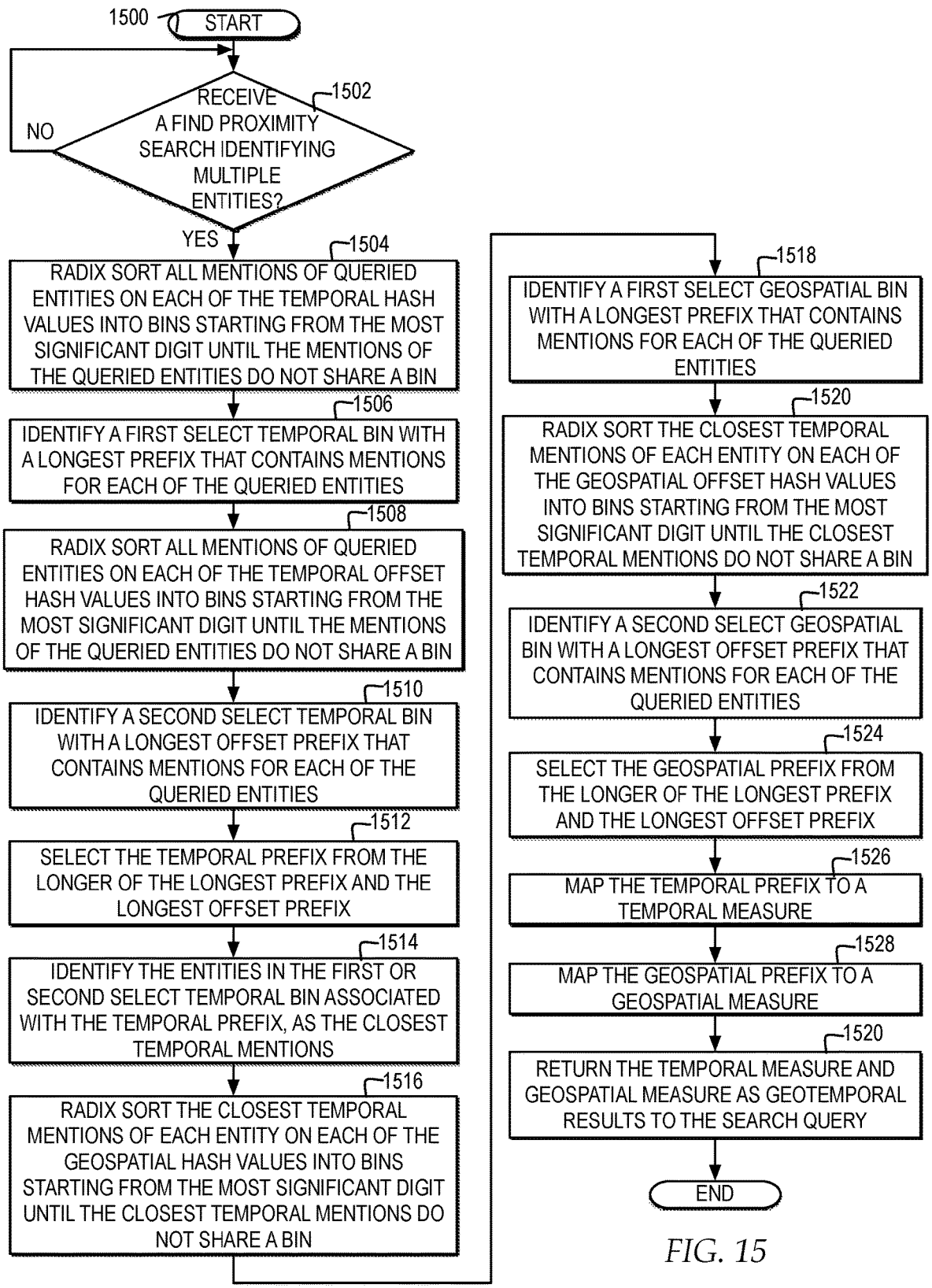
FIG. 15 illustrates a high level logic flowchart of a process and computer program for performing transitive proximity-based entity searching to find mentions of two or more searched entities to identify a degree of granularity of closest geotemporal proximity of the searched entities through the knowledge graph.

FIG. 15 illustrates a high level logic flowchart of a process and computer program for performing transitive proximity-based entity searching to find mentions of two or more searched entities to identify a degree of granularity of closest geotemporal proximity of the searched entities through the knowledge graph.

In one example, the process and computer program start at block 1500, and thereafter proceeds to block 1502. Block 1502 illustrates a determination whether a find proximity search identifying multiple entities is received. Next, block 1504 illustrates radix sorting all mentions of queried entities on each of the temporal hash values into bins starting from the most significant digit until the mentions of the queried entities do not share a bin. Thereafter, block 1506 illustrates identifying a first select temporal bin with a longest prefix that contains mentions for each of the queried entities. Next, block 1508 illustrates radix sorting all mentions of queried entities on each of the temporal offset hash values into bins starting from the most significant digit until the mentions of the queried entities do not share a bin. Thereafter, block 1510 illustrates identifying a second select temporal bin with a longest offset prefix that contains mentions for each of the queried entities. Next, block 1512 illustrates selecting the temporal prefix from the longer of the longest prefix and the longest offset prefix. Thereafter, block 1514 illustrates identifying the entities in the first or second temporal bin associated with the temporal prefix, as the closest temporal mentions. Next, block 1516 illustrates radix sorting the closest temporal mentions of each entity on each of the geospatial hash values into bins starting from the most significant digit until the closest temporal mentions do not share a bin. Thereafter, block 1518 illustrates identifying a first select geospatial bin with a longest prefix that contains mentions for each of the queried entities. Next, block 1520 illustrates radix sorting the closest temporal mentions of each entity on each of the geospatial offset hash values into bins starting from the most significant digit until the closest temporal mentions do not share a bin. Thereafter, block 1522 illustrates identifying a second select geospatial bin with a longest offset prefix that contains mentions for each of the queried entities. Next, block 1524 illustrates selecting the geospatial prefix from the longer of the longest prefix in the longest offset prefix. Thereafter, block 1526 illustrates mapping the temporal prefix to a temporal measure. Next, block 1528 illustrates mapping the geospatial prefix to a geospatial measure. Thereafter, block 1530 illustrates returning the temporal measure and geospatial measure as geotemporal results to the search query, and the process ends.

Figure 16:
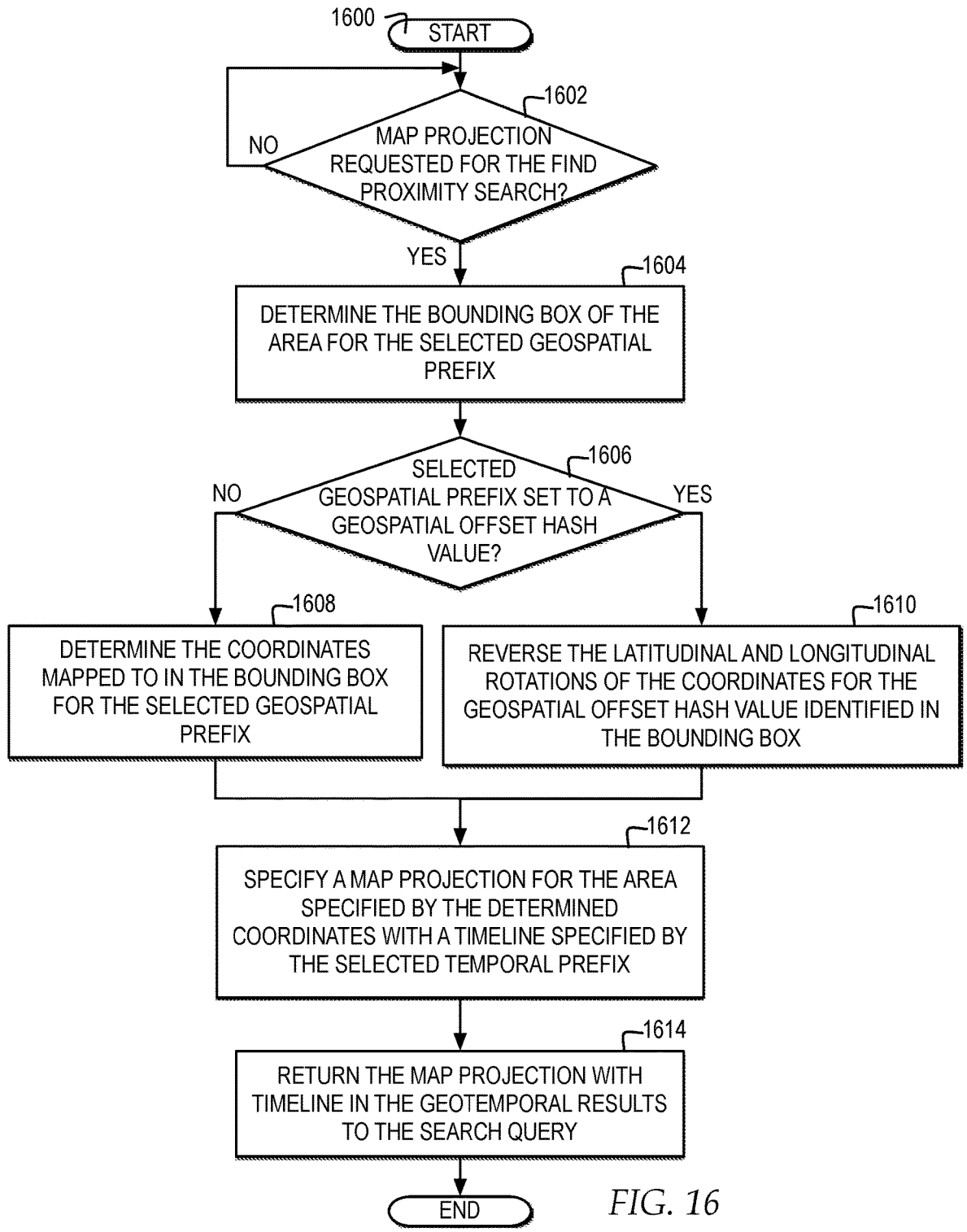
FIG. 16 illustrates a high-level logic flowchart of a process and computer program for generating a map projection for the results of a find proximity search for illustrating the closest geotemporal proximity of the searched entities.

FIG. 16 illustrates a high-level logic flowchart of a process and computer program for generating a map projection for the results of a find proximity search for illustrating the closest geotemporal proximity of the searched entities.

In one example, the process and computer program start at block 1600 and thereafter proceed to block 1602. Block 1602 illustrates a determination whether a find proximity search query includes a request for a map projection. At block 1602, if a find proximity search query includes a request for a map projection, then the process passes to block 1604. Block 1604 illustrates determining the bounding box of the area for the coordinates of the selected geospatial prefix. Next, block 1606 illustrates a determination whether the selected geospatial prefix is set to a geospatial offset hash value. At block 1606, if the selected geospatial prefix is set to a geospatial offset hash value, then the process passes to block 1610. Block 1610 illustrates reversing the latitudinal and longitudinal rotations of the coordinates of the geospatial offset value identified for the bounding box. Returning to block 1606, if the selected geospatial prefix is not set to a geospatial offset hash value, then the process passes to block 1608. Block 1608 illustrates determining the coordinates mapped to in the bounding box for the selected geospatial prefix, and the process passes to block 1612.

Block 1612 illustrates specifying a map projection for the area specified by the determined coordinates with a timeline specified by the selected temporal prefix. Next, block 1614 illustrates returning the map projection with timeline in the geotemporal results to the search query, and the process ends.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, occur substantially concurrently, or the blocks may sometimes occur in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising", when used in this specification specify the presence of stated features, integers, steps, operations, elements, and/or components, but not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the one or more embodiments of the invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described to best explain the principles of the invention and the practical application, and to enable others of ordinary skill in the art to understand the invention for various embodiments with various modifications as are suited to the particular use contemplated.

The foregoing description is just an example of embodiments of the invention, and variations and substitutions. While the invention has been particularly shown and described with reference to one or more embodiments, it will be understood by those skilled in the art that various changes in form and detail may be made therein without departing from the spirit and scope of the invention.

What is claimed is:

1. A method, comprising:
    generating, by a computer system, a knowledge graph comprising a plurality of entries, each entry comprising a separate entity identifier and a separate entity mention identifier within separate documents of a corpus of a plurality of documents, the separate entity identifier and the separate entity mention identifier having one or more computed prefix-based geotemporal values determined from geotemporal information associated with the separate entity identifier and the separate entity mention identifier, the geotemporal information denoting a place and a time of the separate entity identifier and the separate entity mention identifier;
    in response to receiving an input comprising a particular entity and a threshold value, mapping, by the computer system, the threshold value to a geospatial hash prefix type and a temporal hash prefix type; and
    applying, by the computer system, geospatial hash prefix type and the temporal hash prefix type to the plurality of entries in the knowledge graph to determine a response to the input indicating one or more geotemporal proximate entities identified within a degree of geotemporal proximity to the particular entity set by the threshold value.

2. The method according to claim 1, wherein generating, by the computer system, the knowledge graph comprising the plurality of entries, each entry comprising the separate entity identifier and the separate entity mention identifier within the separate documents of a corpus of the plurality of documents, the separate entity identifier and the separate entity mention identifier having the one or more computed prefix-based geotemporal values determined from the geotemporal information associated with the separate entity identifier and the separate entity mention identifier within the separate documents, the geotemporal information denoting a place and a time of the separate entity identifier and the separate entity mention identifier, further comprises:
    responsive to detecting geospatial information and temporal information associated with a mention of the separate entity identifier in the separate documents, converting, by the computer system, the geospatial information into a specified geospatial format and the temporal information into a specified temporal format;
    computing, by the computer system, one or more prefix-based geospatial values for the converted geospatial information and one or more prefix-based temporal values for the converted temporal information; and
    encoding, by the computer system, a separate entry in the knowledge graph for the mention of the entity from the separate document with the separate entity identifier, the separate entity mention identifier, and the one or more computed prefix-based geotemporal values comprising the one or more prefix-based geospatial values and the one or more prefix-based temporal values, wherein each digit of the one or more prefix-based geospatial values and the one or more prefix-based temporal values in the knowledge graph that matches another one or more prefix-based geospatial values and another one or more prefix-based temporal values in another entry for another entity mention in the knowledge graph reflects a degree of granularity of geotemporal proximity of the entity and the another entity.

3. The method according to claim 2, wherein computing, by the computer system, the one or more prefix-based geospatial values for the converted geospatial information and the one or more prefix-based temporal values for the converted temporal information further comprises:
    computing, by the computer system, a prefix-based geospatial hash value by applying a hash function to the converted geospatial information; and
    computing, by the computer system, a prefix-based geospatial offset hash value by rotating a latitude and longitude of the prefix-based geospatial hash value by a rotation value, wherein each digit of the prefix-based geospatial hash value and prefix-based geospatial offset hash value that matches another prefix-based geospatial hash value and another prefix-based geospatial offset hash value in the another entry for the another entity mention in the knowledge graph reflects the degree of granularity of geospatial proximity of the entity and the another entity.

4. The method according to claim 1, wherein in response to receiving an input comprising a particular entity and a threshold value, mapping, by the computer system, the threshold value to a geospatial hash prefix type and a temporal hash prefix type further comprises:
    mapping, by the computer system, the threshold value comprising a geospatial granularity and a temporal granularity to the geospatial hash prefix type comprising a geospatial hash prefix length of the geospatial granularity and a temporal hash prefix type comprising a temporal hash prefix length of the temporal granularity.

5. The method according to claim 1, wherein in response to receiving an input comprising a particular entity and a threshold value, mapping, by the computer system, the threshold value to a geospatial hash prefix type and a temporal hash prefix type further comprises:
    mapping, by the computer system, the threshold value comprising a geospatial location and a temporal location to the geospatial hash prefix type comprising a geospatial hash prefix of the geospatial location and a temporal hash prefix type comprising a temporal hash prefix of the temporal location.

6. The method according to claim 1, wherein applying, by the computer system, geospatial hash prefix type and the temporal hash prefix type to the plurality of entries in the knowledge graph to determine a response to the input indicating one or more geotemporal proximate entities identified within a degree of geotemporal proximity to the particular entity set by the threshold value further comprises:
   radix sorting, by the computer system, a first selection of mentions of the particular entity and a second selection of mentions of the other entities in the knowledge graph on each the temporal hash prefix type into a first selection of bins starting from a most significant digit;
   identifying, by the computer system, one or more temporal bins from among the first selection of bins with the particular entity and that share a separate temporal hash prefix matching the temporal hash prefix type;
   identifying, by the computer system, a third selection of entity mentions in the one or more temporal bins that are different from the particular entity;
   radix sorting, by the computer system, the first selection of mentions of the particular entity and the third selection of entity mentions on each geospatial hash prefix type into a second selection of bins starting from the most significant digit;
   identifying, by the computer system, one or more geospatial bins from among the second selection of bins with the particular entity and that share a separate geospatial hash prefix matching the geospatial hash prefix type;
   identifying, by the computer system, a fourth selection of entity mentions in the one or more geospatial bins that are different from the particular entity; and
   returning, by the computer system, the fourth selection of entity mentions as the one or more geotemporal proximate entities.

7. The method according to claim 1, further comprising:
   returning, by the computer system, a response to the input to a user submitting the input as a query, the response indicating one or more geotemporal proximate entities identified within a degree of geotemporal proximity to the particular entity set by the threshold value.

8. A computer system comprising one or more processors, one or more computer-readable memories, one or more computer-readable storage devices, and program instructions, stored on at least one of the one or more storage devices for execution by at least one of the one or more processors via at least one of the one or more memories, the stored program instructions comprising:
   program instructions to generate a knowledge graph comprising a plurality of entries, each entry comprising a separate entity identifier and a separate entity mention identifier within separate documents of a corpus of a plurality of documents, the separate entity identifier and the separate entity mention identifier having one or more computed prefix-based geotemporal values determined from geotemporal information associated with the separate entity identifier and the separate entity mention identifier, the geotemporal information denoting a place and a time of the separate entity identifier and the separate entity mention identifier;
   program instructions, in response to receiving an input comprising a particular entity and a threshold value, to map the threshold value to a geospatial hash prefix type and a temporal hash prefix type; and
   program instructions to apply the geospatial hash prefix type and the temporal hash prefix type to the plurality of entries in the knowledge graph to determine a response to the input indicating one or more geotemporal proximate entities identified within a degree of geotemporal proximity to the particular entity set by the threshold value.

9. The computer system according to claim 8, the program instructions to generate the knowledge graph comprising the plurality of entries, each entry comprising the separate entity identifier and the separate entity mention identifier within the separate documents of a corpus of the plurality of documents, the separate entity identifier and the separate entity mention identifier having the one or more computed prefix-based geotemporal values determined from the geotemporal information associated with the separate entity identifier and the separate entity mention identifier within the separate documents, the geotemporal information denoting a place and a time of the separate entity identifier and the separate entity mention identifier, further comprising:
   program instructions, responsive to detecting geospatial information and temporal information associated with a mention of the separate entity identifier in the separate document, to convert the geospatial information into a specified geospatial format and the temporal information into a specified temporal format;
   program instructions to compute one or more prefix-based geospatial values for the converted geospatial information and one or more prefix-based temporal values for the converted temporal information; and
   program instructions to encode a separate entry in the knowledge graph for the mention of the entity from the separate document with the separate entity identifier, the separate entity mention identifier, and the one or more computed prefix-based geotemporal values comprising the one or more prefix-based geospatial values and the one or more prefix-based temporal values, wherein each digit of the one or more prefix-based geospatial values and the one or more prefix-based temporal values in the knowledge graph that matches another one or more prefix-based geospatial values and another one or more prefix-based temporal values in another entry for another entity mention in the knowledge graph reflects a degree of granularity of geotemporal proximity of the entity and the another entity.

10. The computer system according to claim 9, wherein the program instructions to compute the one or more prefix-based geospatial values for the converted geospatial information and the one or more prefix-based temporal values for the converted temporal information further comprises:
   program instructions to compute a prefix-based geospatial hash value by applying a hash function to the converted geospatial information; and
   program instructions to compute a prefix-based geospatial offset hash value by rotating a latitude and longitude of the prefix-based geospatial hash value by a rotation value, wherein each digit of the prefix-based geospatial hash value and prefix-based geospatial offset hash value that matches another prefix-based geospatial hash value and another prefix-based geospatial offset hash value in the another entry for the another entity mention in the knowledge graph reflects the degree of granularity of geospatial proximity of the entity and the another entity.

11. The computer system according to claim 8, wherein the program instructions, in response to receiving an input comprising a particular entity and a threshold value, to map the threshold value to a geospatial hash prefix type and a temporal hash prefix type further comprises:
  program instructions to map the threshold value comprising a geospatial granularity and a temporal granularity to the geospatial hash prefix type comprising a geospatial hash prefix length of the geospatial granularity and a temporal hash prefix type comprising a temporal hash prefix length of the temporal granularity.

12. The computer system according to claim 8, wherein the program instructions, in response to receiving an input comprising a particular entity and a threshold value, to map the threshold value to a geospatial hash prefix type and a temporal hash prefix type further comprises:
  program instructions to map the threshold value comprising a geospatial location and a temporal location to the geospatial hash prefix type comprising a geospatial hash prefix of the geospatial location and a temporal hash prefix type comprising a temporal hash prefix of the temporal location.

13. The computer system according to claim 8, wherein the program instructions to apply the geospatial hash prefix type and the temporal hash prefix type to the plurality of entries in the knowledge graph to determine a response to the input indicating one or more geotemporal proximate entities identified within a degree of geotemporal proximity to the particular entity set by the threshold value further comprises:
  program instructions to radix sort a first selection of mentions of the particular entity and a second selection of mentions of the other entities in the knowledge graph on each the temporal hash prefix type into a first selection of bins starting from a most significant digit;
  program instructions to identify one or more temporal bins from among the first selection of bins with the particular entity and that share a separate temporal hash prefix matching the temporal hash prefix type;
  program instructions to identify a third selection of entity mentions in the one or more temporal bins that are different from the particular entity;
  program instructions to radix sort the first selection of mentions of the particular entity and the third selection of entity mentions on each geospatial hash prefix type into a second selection of bins starting from the most significant digit;
  program instructions to identify one or more geospatial bins from among the second selection of bins with the particular entity and that share a separate geospatial hash prefix matching the geospatial hash prefix type;
  program instructions to identify a fourth selection of entity mentions in the one or more geospatial bins that are different from the particular entity; and
  program instructions to return the fourth selection of entity mentions as the one or more geotemporal proximate entities.

14. The computer system according to claim 8, further comprising:
  program instructions to return a response to the input to a user submitting the input as a query, the response indicating one or more geotemporal proximate entities identified within a degree of geotemporal proximity to the particular entity set by the threshold value.

15. A computer program product comprises a computer readable storage medium having program instructions embodied therewith, wherein the computer readable storage medium is not a transitory signal per se, the program instructions executable by a computer to cause the computer to:
  generate, by a computer, a knowledge graph comprising a plurality of entries, each entry comprising a separate entity identifier and a separate entity mention identifier within separate documents of a corpus of a plurality of documents, the separate entity identifier and the separate entity mention identifier having one or more computed prefix-based geotemporal values determined from geotemporal information associated with the separate entity identifier and the separate entity mention identifier, the geotemporal information denoting a place and a time of the separate entity identifier and the separate entity mention identifier;
  in response to receiving an input comprising a particular entity and a threshold value, map, by the computer, the threshold value to a geospatial hash prefix type and a temporal hash prefix type; and
  apply, by the computer, geospatial hash prefix type and the temporal hash prefix type to the plurality of entries in the knowledge graph to determine a response to the input indicating one or more geotemporal proximate entities identified within a degree of geotemporal proximity to the particular entity set by the threshold value.

16. The computer program product according to claim 15, the program instructions to generate the knowledge graph comprising the plurality of entries, each entry comprising the separate entity identifier and the separate entity mention identifier within the separate documents of a corpus of the plurality of documents, the separate entity identifier and the separate entity mention identifier having the one or more computed prefix-based geotemporal values determined from the geotemporal information associated with the separate entity identifier and the separate entity mention identifier within the separate documents, the geotemporal information denoting a place and a time of the separate entity identifier and the separate entity mention identifier, further comprising:
  responsive to detecting geospatial information and temporal information associated with a mention of the separate entity identifier in the separate document, convert, by the computer, the geospatial information into a specified geospatial format and the temporal information into a specified temporal format;
  compute, by the computer, one or more prefix-based geospatial values for the converted geospatial information and one or more prefix-based temporal values for the converted temporal information; and
  encode, by the computer, a separate entry in the knowledge graph for the mention of the entity from the separate document with the separate entity identifier, the separate entity mention identifier, and the one or more computed prefix-based geotemporal values comprising the one or more prefix-based geospatial values and the one or more prefix-based temporal values, wherein each digit of the one or more prefix-based geospatial values and the one or more prefix-based temporal values in the knowledge graph that matches another one or more prefix-based geospatial values and another one or more prefix-based temporal values in another entry for another entity mention in the knowledge graph reflects a degree of granularity of geotemporal proximity of the entity and the another entity.

17. The computer program product according to claim 16, further comprising the program instructions executable by a computer to cause the computer to:
  compute, by the computer, a prefix-based geospatial hash value by applying a hash function to the converted geospatial information; and compute, by the computer, a prefix-based geospatial offset hash value by rotating a latitude and longitude of the prefix-based geospatial hash value by a rotation value, wherein each digit of the prefix-based geospatial hash value and prefix-based geospatial offset hash value that matches another prefix-based geospatial hash value and another prefix-based geospatial offset hash value in the another entry for the another entity mention in the knowledge graph reflects the degree of granularity of geospatial proximity of the entity and the another entity.

18. The computer program product according to claim 15, further comprising the program instructions executable by a computer to cause the computer to:

map, by the computer, the threshold value comprising a geospatial granularity and a temporal granularity to the geospatial hash prefix type comprising a geospatial hash prefix length of the geospatial granularity and a temporal hash prefix type comprising a temporal hash prefix length of the temporal granularity.

19. The computer program product according to claim 15, further comprising the program instructions executable by a computer to cause the computer to:

map, by the computer, the threshold value comprising a geospatial location and a temporal location to the geospatial hash prefix type comprising a geospatial hash prefix of the geospatial location and a temporal hash prefix type comprising a temporal hash prefix of the temporal location.

20. The computer program product according to claim 15, further comprising the program instructions executable by a computer to cause the computer to:

return, by the computer, a response to the input to a user submitting the input as a query, the response indicating one or more geotemporal proximate entities identified within a degree of geotemporal proximity to the particular entity set by the threshold value.

\* \* \* \* \*